(12) United States Patent
Osman

(10) Patent No.: US 11,959,438 B2
(45) Date of Patent: Apr. 16, 2024

(54) ULTRA QUIET SPLIT FLOW THRUST REVERSER

(71) Applicant: Medhat Osman, Gilbert, AZ (US)

(72) Inventor: Medhat Osman, Gilbert, AZ (US)

( * ) Notice: Subject to any disclaimer, the term of this patent is extended or adjusted under 35 U.S.C. 154(b) by 0 days.

(21) Appl. No.: 17/678,583

(22) Filed: Feb. 23, 2022

(65) Prior Publication Data

US 2023/0213001 A1  Jul. 6, 2023

Related U.S. Application Data

(60) Provisional application No. 63/295,230, filed on Dec. 30, 2021.

(51) Int. Cl.
| | | |
|---|---|---|
| *F02K 1/44* | (2006.01) | |
| *F02K 1/60* | (2006.01) | |
| *F02K 1/76* | (2006.01) | |

(52) U.S. Cl.
CPC ............... *F02K 1/44* (2013.01); *F02K 1/605* (2013.01); *F02K 1/766* (2013.01)

(58) Field of Classification Search
CPC ... F02K 1/60; F02K 1/605; F02K 1/44; F02K 1/763; F02K 1/766; F02K 1/38; F02K 1/46; F02K 1/48
See application file for complete search history.

(56) References Cited

U.S. PATENT DOCUMENTS

| | | | | |
|---|---|---|---|---|
| 4,182,501 A * | 1/1980 | Fage | .......................... | F02K 1/60 244/110 B |
| 6,260,801 B1 * | 7/2001 | Peters | ....................... | F02K 1/60 239/265.29 |

(Continued)

FOREIGN PATENT DOCUMENTS

| | | | | |
|---|---|---|---|---|
| FR | 1280298 A | * | 11/1961 | ............... F02K 1/60 |
| FR | 2627806 A1 | * | 9/1989 | ............... F02K 1/60 |

*Primary Examiner* — Andrew H Nguyen
(74) *Attorney, Agent, or Firm* — Clark Hill PLC

(57) ABSTRACT

A thrust reverser system for jet aircraft comprising an exhaust tailpipe mounted to the turbine engine aft turbine flange and two clamshell doors, actuators and a locking system to prevent inadvertent deployment of the clamshell doors in-flight. Two improved design clamshell doors configurations, either one or a combination of both, mounted on either side of the top and bottom of the exhaust tailpipe, fitted with two patented design actuators mounted one on each side of the external sides of the tailpipe between the clamshell doors and the tailpipe, possibly in a depression in the tailpipe called blister, assuming them to be hydraulic actuators for discussion purposes. The actuators drive the clamshell doors using improved floating linkages loosely pivoted to the exterior of the exhaust tailpipe. The actuators are connected to the doors through mechanical linkages, to deploy the doors aft of the tailpipe exhaust area during deceleration after landing, diverting the exhaust gases forward to slow down the aircraft, and the actuators also drive two movable fairings during thrust reverser operation to enclose the reversed exhaust flow forward to prevent its impingement on the skin of the aircraft and provide a ram inlet area with the sides of the clamshell doors allowing ram air from the surrounding free stream to be scooped through the gap between the movable fairing and clamshell doors thereby provide cooling of the door surface in contact with the exhaust gases and mix with the engine exhaust gases in reverse thrust mode thereby augmenting reverse thrust mass flow and energy. The exhaust tailpipe can have a circular or any geometric exhaust section or in other configuration can be fitted in with a flow mixer with the surrounding ambient air to reduce shear noise resulting from the high velocity exhaust gases for noise attenuation. The flow mixer can also be perforated to allow for suction of ambient air by the lower static pressure engine exhaust gases to reduce shear noise (Continued)

and increase mixing and thrust. Two fixed fairings, above and below the tailpipe at the exit section can have perforations and also perforations on the movable fairings to educt surrounding air also to reduce shear noise between surrounding air and the engine exhaust flow during forward thrust based on SAE Aerospace Information Report AIR-1191 and method of calculation. Other configurations for the trailing edges of the fixed and movable fairings can have wavy contour lines to increase the contact area between the engine exhaust gases and the surrounding air to reduce shear noise as well. Fixed circular shape or rolling bodies, depicted as wheels for discussion purpose, but they can be of any shape, mounted on the top and bottom of the tailpipe at the forward end which get lodged in the upper and lower forward frames of the clamshell doors in the stow position to provide one of the mechanical locking systems. A second mechanical locking system is a high strength compression steel spring which is part of the linkages used to deploy and stow the clamshell doors, which at the end of the stow stroke is buckled to prevent the clamshell doors deploy mechanism from moving, thereby keeping the doors securely stowed. A third locking mechanism consisting of electrically actuated locks which engage the clamshell doors in the stow position and lock the movable fairings to prevent them from being entrained by the free stream during flight.

18 Claims, 20 Drawing Sheets

(56) References Cited

U.S. PATENT DOCUMENTS

| | | | |
|---|---|---|---|
| 7,043,897 B2 * | 5/2006 | Osman | F02K 1/766 244/110 B |
| 2010/0077879 A1 * | 4/2010 | Davies | F02K 1/763 74/89.38 |
| 2011/0192167 A1 * | 8/2011 | Sylla | F02K 1/48 60/770 |
| 2017/0191447 A1 * | 7/2017 | Osman | F02K 1/60 |
| 2020/0063474 A1 * | 2/2020 | Timms | E05C 3/02 |

* cited by examiner

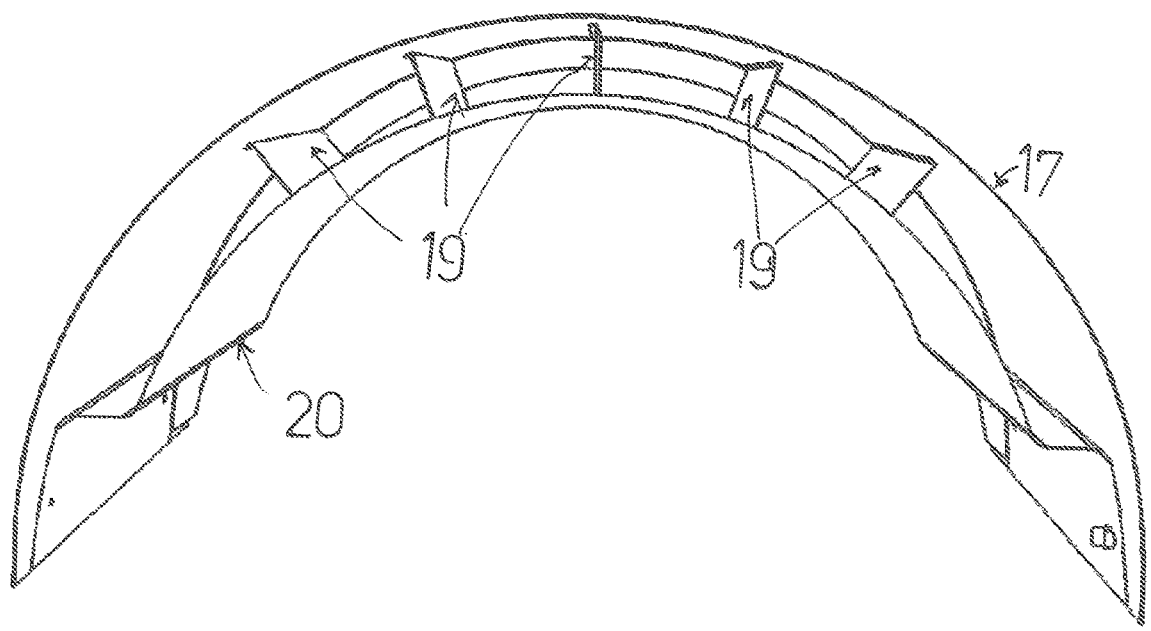
FIG 13 A-A
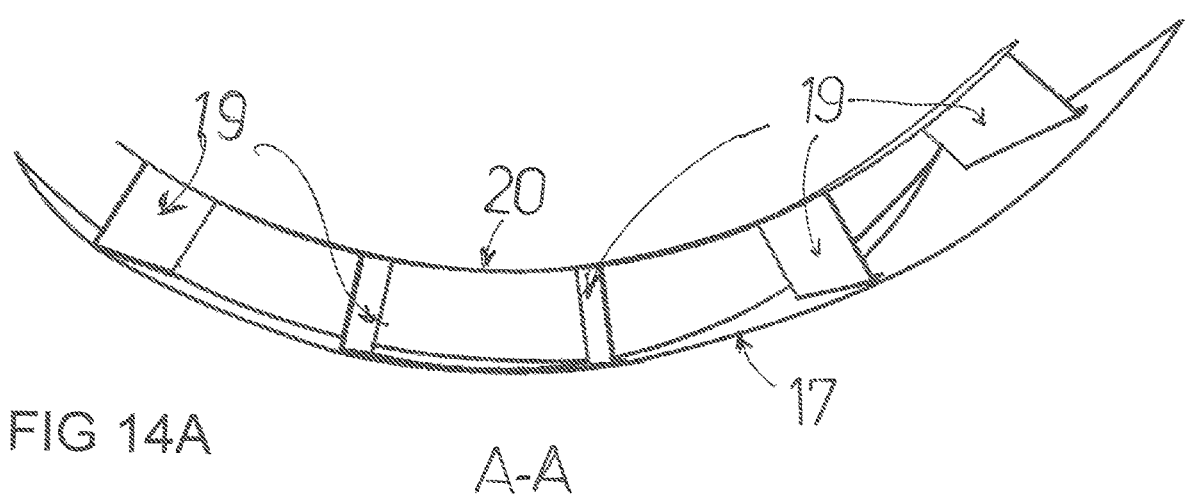
FIG 14A
A-A

ULTRA QUIET SPLIT FLOW THRUST REVERSER

FIELD OF INVENTION

This invention relates to thrust reverser systems for Turbojets and High Bypass Jet Engines.

This patent relates to the Application Document No. 63/259,878 Filed on Aug. 8, 2021.

BACKGROUND OF THE INVENTION

Thrust reverser systems are used to decelerate a jet aircraft on the ground which can be after landing or during taxiing at high speed or in case of aborted take-off or to back up the aircraft from a tight spot or from a gate. Reversing the direction of the engine exhaust gas flow forward provides the desired deceleration especially on short runways, slowing down the aircraft to a safe speed to exit the runway to a taxiway, allowing the pilot to use the brakes on taxiways.

THE ULTRA QUIET SPLIT FLOW THRUST REVERSER SYSTEM, like previous ULTRA THRUST REVERSER designs such as U.S. Pat. Nos. 5,615,834 and 7,043,897 and 10,156,207 consists of a continuous one-piece exhaust tailpipe made of several assemblies to prevent any exhaust gas leakages to maximize thrust. Two clamshell doors enclosing the tailpipe which can be semi-circular, square, trapezoidal or any shape conforming with the airframer specified aerodynamic contour lines for the engine nacelle, along with many features from previous ULTRA THRUST REVERSER patents.

The ULTRA QUIET SPLIT FLOW THRUST REVERSER SYSTEM aims at increasing reverse thrust efficiency by several folds in comparison with current target thrust reverser designs and also incorporates sound attenuation improvements.

The clamshell doors of the ULTRA QUIET SPLIT FLOW THRUST REVERSER SYSTEM are shaped to maximize reverse flow in the forward direction. There are two improved clamshell door configurations which both consist of an outer skin and an inner skin. In one configuration the outer skin and inner skin are independently stiffened by metallic stiffeners which can be in any form like L-angles or beads like in the case of the inner skin and joined along the longitudinal target doors' edges. In another configuration the outer skin and the inner skin are connected by longitudinal supports which can be solid plates or of any other shape and joined along the longitudinal target doors' edges. In current clamshell doors designs for target thrust reversers, the doors serve as a solid surface for the exhaust gases to bounce off of them along the inner surface of the door at an angle of around 83' in the deploy mode where the horizontal component of the flow, which is the cosine of 83°, provides reverse thrust. The ULTRA QUIET SPLIT FLOW THRUST REVERSER SYSTEM clamshell doors are shaped to split and divert a portion of the engine exhaust flow upward in the duct channel formed between the inner and outer door skins while the remaining portion of the engine exhaust flow, flows upward along the outer surface of the inner skin at an angle of around 83'. In both clamshell doors configurations, the outer skin and inner skin join along the sides of the clamshell doors. The outer skin of each clamshell door joins at each end with a frame. The frame at the rear end of the clamshell door is used as a shape former and as a diverter in the deploy mode of the engine exhaust along the surfaces of the clamshell doors, the upper and lower doors, and as an inlet ramp for the split exhaust gas flowing in between the outer skin and the inner skin of the clamshell doors. The other frame at the forward end of the clamshell doors serves as a shape former and as an exit ramp for the split flow to exit at an angle around 50' to rejoin and divert the 83° flow resulting in a resultant reverse thrust flow at around 53', thereby increasing reverse thrust by up to three to six folds based on the difference of cosine of 83' for traditional clamshell doors of other target thrust reverser designs and the resultant flow cosine 53" of the improved ULTRA QUIET SPLIT FLOW THRUST REVERSER SYSTEM. The resultant flow at around 53° aims at avoiding exhaust gas reinjection by the engine. The forward and rear frames can be machined as one solid piece or can be assembled from detailed parts joined together. The other side of the rear frame serves as a bumper surface between the upper and lower clamshell doors in deploy mode. The forward frame of the clamshell door can be machined as one solid piece or can be assembled from detailed parts joined together and can have some lightening holes for weight reduction. One of the lightening holes engages with a rolling wheel as described in the text or rolling body shape to lock the door in the stowed position.

Diverting exhaust reverse flow forward not only increases the reverse thrust efficiency to decelerate the aircraft by up to three folds or more but it also steers the exhaust flow away from the empennage and vertical rudder of the aircraft which causes what is known as rudder blanking during reverse thrust for aircraft with tail mounted engines which adversely reduces the pilot's ability to directionally control the aircraft using the rudder on the ground during reverse thrust because of the reverse thrust flowing upward at 83° from both engines literally rendering the tail rudder ineffective.

The ULTRA QUIET SPLIT FLOW THRUST REVERSER SYSTEM noise attenuation improvements aim at increasing the mixing and line of contact between the engine exhaust flow and surrounding ambient air. This is accomplished by fitting a sort of a mixer nozzle to the exhaust tailpipe which provides more line of contact with ambient air in comparison with the circular cross-section of the exhaust tailpipe. Adding perforations to the wall of the tailpipe mixer can further enhance noise attenuation by eductor action between low static pressure engine exhaust gases and ambient air.

The fixed and movable fairings are also improved for noise abatement by increasing the contact line at the trailing edge between the engine exhaust gases and ambient surrounding air using scallops or chevrons. Another noise attenuation improvement for the fixed and movable fairings can be accomplished by making a series of perforations along their trailing edges. Suction due to lower static pressure of the exhaust gases will educt ambient air through the perforations reducing shear velocity thereby contributing to noise abatement.

Improvements to the mechanical linkages used to deploy the door aim at providing mechanical locking provisions to prevent inadvertent deployment. The first improvement which is different from previous ULTRA THRUST REVERSER linkage mechanism is the use of high-strength compression spring in the driving link mechanism. At the end of the stow stroke, the actuator buckles the high-strength compression spring rendering the driving linkage inoperative due to the extreme force needed in case aerodynamic force on the door tries to deploy it in flight. Also, the pivoting holes of the driver and trailing linkages will be elongated slot shaped not circular to allow the doors to be pushed aft after stow thereby pushing the edge of the forward frame under the center of rotation of locking wheel or circular cylinder, thereby rendering vertical motion and rotation of the clamshell door impossible without the activation of the actuator forward during normal deploy sequence. During the deploy sequence, the actuator will move forward, unbuckling the locking high-strength compression spring and also allowing the doors to translate due to the driver and trailing links slots, past the center of the locking body or roller wheel, thereby allowing the doors, upper and lower to deploy, clearing the locking body and/or miler wheel, overcoming the elasticity of the supporting mount.

SUMMARY OF THE INVENTION

The subject disclosure presents an innovative patent for an aircraft system exhaust system improving THE ULTRA and/or SQUARE THRUST REVERSER SYSTEM, U.S. Pat. Nos. 5,615,834, 7,043,897 and 10,156,207 features of The ULTRA or SQUARE ULTRA REVERSER, referred to collectively in the text as THE ULTRA REVERSER, to a thrust reverser system providing innovative circular shape, square shape or trapezoidal geometric shape split flow target door designs assuring higher reverse thrust efficiency, reducing potential rudder blanking due to reverse thrust flow which is a common problem for tail mounted engines and providing three locking system concepts to mitigate the chances of inadvertent deployment of the clamshell doors and the thrust reverser in-flight.

THE ULTRA QUIET SPLIT FLOW THRUST REVERSER SYSTEM innovative target clamshell doors design turns the door into a continuous duct and di\crier of engine exhaust gases in reverse thrust mode instead of being a blocking surface for the engine exhaust gases to impinge against which can result in back-pressure of the turbomachinery of the gas turbine engine and flow turbulence and internal losses reducing the kinetic energy of the exhaust flow resulting in lower reverse thrust efficacy.

The two innovative embodiments of the target doors of THE ULTRA QUIET SPLIT FLOW THRUST REVERSER SYSTEM consist of an outer skin shaped according to the contour lines of the nacelle and an inner skin, In one embodiment, the outer skin and the inner skin are joined along the side edges of the target doors where the outer skin and/or the inner skin can have independent stiffening longitudinal angles which for the purpose of discussion in the figures are L-shaped angles, which stiffen the outer skin to prevent it from buckling under aerodynamic loads to maintain the intended shape of contour lines. The inner skin can have longitudinal stiffening angles or longitudinal grooves, also known as beads for stiffening. The longitudinal stiffening angles and/or longitudinal grooves along with their structural role do act as reverse flow guide vanes along the surface of the inner skin and in the conduit formed between the inner and outer skins for the split reverse flow.

The other innovative embodiment for the target doors of THE ULTRA QUIET SPLIT FLOW THRUST REVERSER SYSTEM consist of an outer skin shaped according to the contour lines of the nacelle and an inner skin joined along the side edges of the target doors, but in between the outer skin and the inner skin there are longitudinal plates joining the inner and outer skins which can be solid continuous surfaces forming conduit cells through which the split reverse flow goes through thereby turning the inner skin and outer skins of the target doors into a conduit for the split reverse flow to flow through. The plates can have lightening holes to reduce weight or can be of a truss shape or any other shape for weight reduction provided that they maintain the outer skin rigidity and free split reverse flow movement along the surfaces of the inner and outer doors skin surfaces.

The outer skin joins the inlet ramp frame at the aft end of the target door, while the forward end of the outer skin joins the exit ramp frame of the split reverse flow. Both ramps are shaped according to the specified contour lines of the nacelle. The inlet ramp consists simplistically of two main surfaces, the inlet ramp surface which diverts the engine exhaust gas flow along the conduit formed by the inner and outer door skins and along the other surface of the inner skin. The other surface of the inlet ramp is the bumper surface in contact with the other door's bumper surface during deployment in reverse thrust mode. The exit ramp at the forward end of the target door consists of an exit ramp angled to divert the split reverse flow at some say 50° angle to meet the rest of the reverse flow along the other surface of the inner skin which is at around 83°, like most reverse flows for typical target thrust reversers, resulting in a combined resultant reverse thrust flow at around 50° to 60' angle the fact which increases reverse thrust by three folds or more since reverse thrust component is the cosine of the angle of the exhaust reverse flow in the forward direction which decelerates the aircraft.

The lower sides of the upper and lower target doors which are at proximity with the movable fairing shall have guide vanes strips for the ram ambient airflow scooped by the gap between the target doors and the movable fairing in deploy mode, to be directed towards the inlet ramp to shield the surface of the inlet ramp from the engine exhaust gases, mix with the exhaust gases, then flow upward with the rest of the exhaust reverse thrust gases thereby increasing the mass flow due to the addition of ambient air to increase the total mass flow for reverse thrust which is a unique innovative idea to increase reverse thrust efficiency.

The side surfaces of the circular. rectangular or trapezoidal doors, act as a strong buffer blocking lateral plumes from the engine exhaust gases, thereby minimizing the possibility of hot gases impingement on the aircraft surfaces and keeping the majority of the reverse exhaust flow contained by the doors to maximize forward decelerating force. Inboard and outboard extensions called underLaps, can be added to the edges of the inner skins of the target doors to be utilized as described in previous ULTRA THRUST designs to contain exhaust gases and prevent reverse gases impingement on the aircraft surfaces.

Both upper and lower target doors sit on top of a continuous tailpipe, which for the sake of discussion it is assumed to be a circular tailpipe, made up of an attachment flange to attach the tailpipe to the engine turbine flange and a circular duct of fixed or variable area as specified by the engine manufacturer. The tailpipe has two internal blisters, one on each side of the tailpipe which each house an ACTUATOR-IN-ACTUATOR (AIA), reference U.S. Pat. No. 10,156,207.

Each actuator is linked to two high-strength compression springs for each door on each side of the tailpipe. The mechanical linkage for each door on each side of the tailpipe consists of a high-strength compression spring connected at one end to the respective ALA lug and the other end to a driver link which in turn connected to the front end of the door. The driver link has elongated pivoting slots which pivots around a fixed pivot on the tailpipe and also enables translation of the door horizontally to lock or release from the locking rolling or fixed body on the tailpipe, Two trailing links, one on each side of the tailpipe, connected to the rear of each door one on each side of the tailpipe with elongated pivoting slots that pivot around a fixed pivot at the rear of the tailpipe allowing translation of the door horizontally in sync with the driver link. There are two AIAs one on each side of the tailpipe where the forward end of the AIAs connected to the mounting flange of the tailpipe.

There are three independent locking systems to prevent inadvertent deployment of the doors of THE ULTRA QUIET SPLIT FLOW THRUST REVERSER SYSTEM. Two of the locking systems are mechanical and one is electric. At the forward end of the tailpipe there are upper and lower brackets to which are mounted a locking rolling or fixed body. When the forward ends of the upper and lower doors are stowed, the forward frame of each door bumps against the locking rolling or fixed body pressing against the brackets until they slide down each roller, and as the AIAs complete the stow stroke the forward end of the upper and lower doors are pushed under the locking rolling or fixed body thereby locking the front ends of the doors in place making them unable to deploy. The pivoting slots of the driver and trailing links allow the translation of the target doors aft and forward to lock and unlock from the locking rolling or fixed body in stow and deploy modes.

The second mechanical locking arrangement is a high-strength compression spring in the mechanical linkage which buckles elastically at the end of the AIAs stow stroke forcing the door in the stow position rendering a door deployment under potential aerodynamic or inertia loads practically impossible because it takes enormous force to overcome the compression spring strength which is locked in place by the AIAs and against the joint on the driver.

The electric locking mechanism arrangement consists of two S-shaped hooks on each side of the tailpipe which are mounted to the aft end of the tailpipe activated via a solenoid energized by the pilot command to deploy or stow. Each S-shaped hook engages each door and the movable fairing to prevent the fairing from being entrained under aerodynamic friction force during flight. Hence each door has three independent locks and each movable fairing has two locks for redundancy.

Noise attenuation achieved by increasing the contact surface between ambient surrounding airflow and the engine exhaust gases by shaping the tailpipe exit area in the shape of a mixer which can also have perforations to educt ambient surrounding air stream into the exhaust gas stream thereby reducing the shear noise even more, Another approach for noise attenuation by increasing the contact area between the movable and fixed fairings and the ambient surrounding airflow using scallops or chevrons, The movable and fixed fairings can have perforations at their respective trailing edges to educt ambient surrounding free stream due the lower static pressure exhaust gas flow effect, thereby contributing to noise reduction and overall increase in exhaust gas flow and thrust.

BRIEF DESCRIPTION OF THE DRAWINGS

A better understanding of the present invention can be obtained from the detailed description of exemplary embodiments set forth below to be considered in conjunction with the attached drawings, in which:

FIG. 13 illustrates section A-A showing the inner skin and outer skin joined by the stiffening partition plates between the inner and outer skins and along the inner and outer skin longitudinal edges FIG. 14A illustrates the inner and outer skins joined by the stiffening partition plates

DETAILED DESCRIPTION OF THE PREFERRED EMBODIMENT

Figure 1:
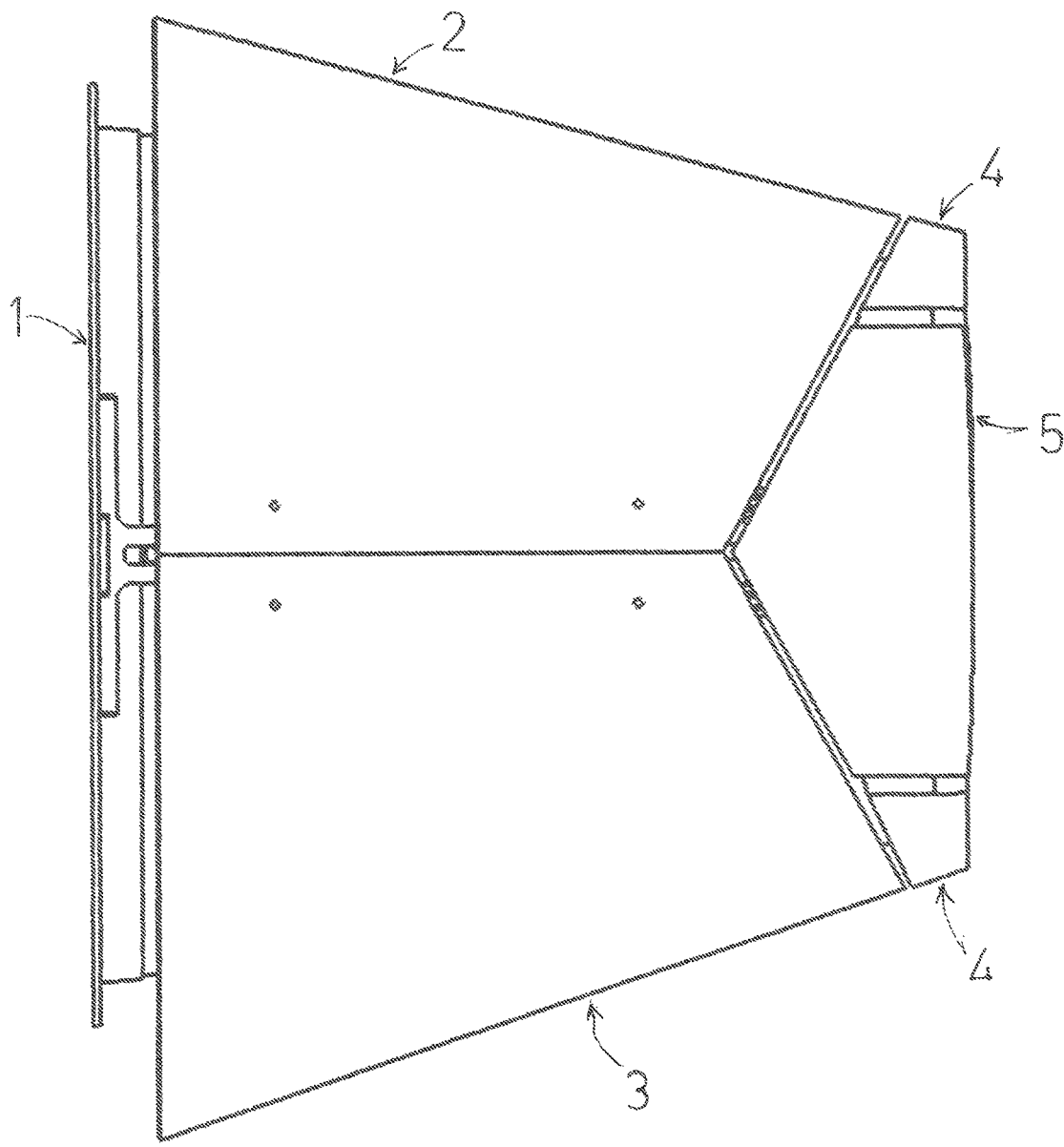
FIG. 1 represents the baseline ULTRA THRUST REVERSER in the stowed position during forward flight

THE ULTRA QUIET SPLIT FLOW ULTRA THRUST REVERSER is a thrust reverser included in preferred embodiments in FIG. 1 in the stowed flying condition which consists of a tailpipe 1, assumed circular for the sake of discussion but it can be of any shape, mounted to the aft end of the jet engine using flange 1A, an upper target door 2 and a lower target door 3, enclosing the tailpipe 1, two fixed fairings 4 on top and under the tailpipe 1 and two movable fairings 5 one on each side of the tailpipe 1 with stiffening plates 5A. Referring to the target doors as upper and lower for the sake of discussion, however, the whole assembly of THE ULTRA QUIET SPLIT FLOW ULTRA THRUST REVERSER can be rotated to any position depending on the installation. THE ULTRA QUIET SPLIT FLOW ULTRA THRUST REVERSER for the most part matches the nacelle contour line with no external protrusions in the free stream.

Figure 2:
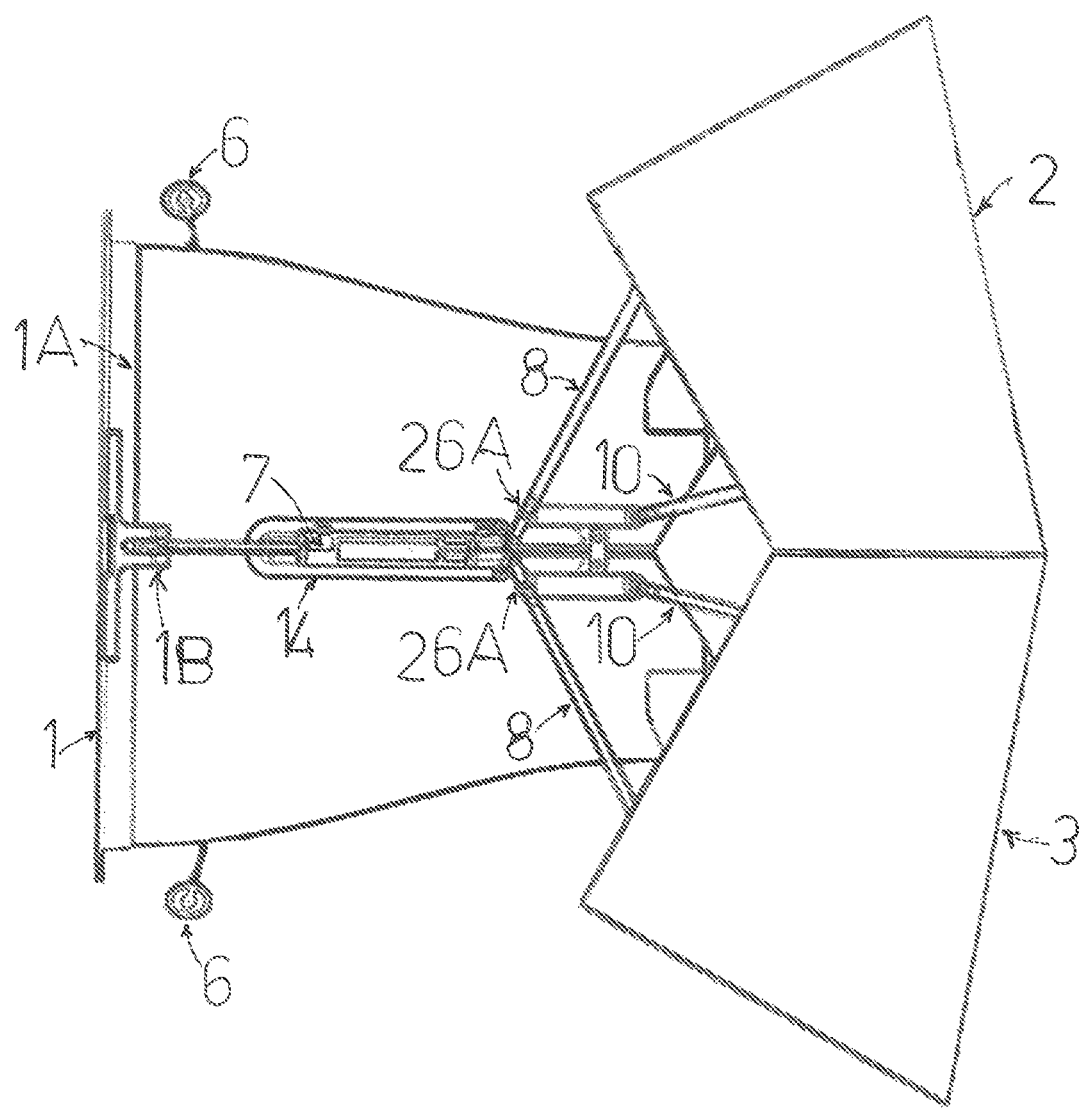
FIG. 2 represents THE ULTRA THRUST REVERSER in the deploy reverse thrust mode
Figure 3:
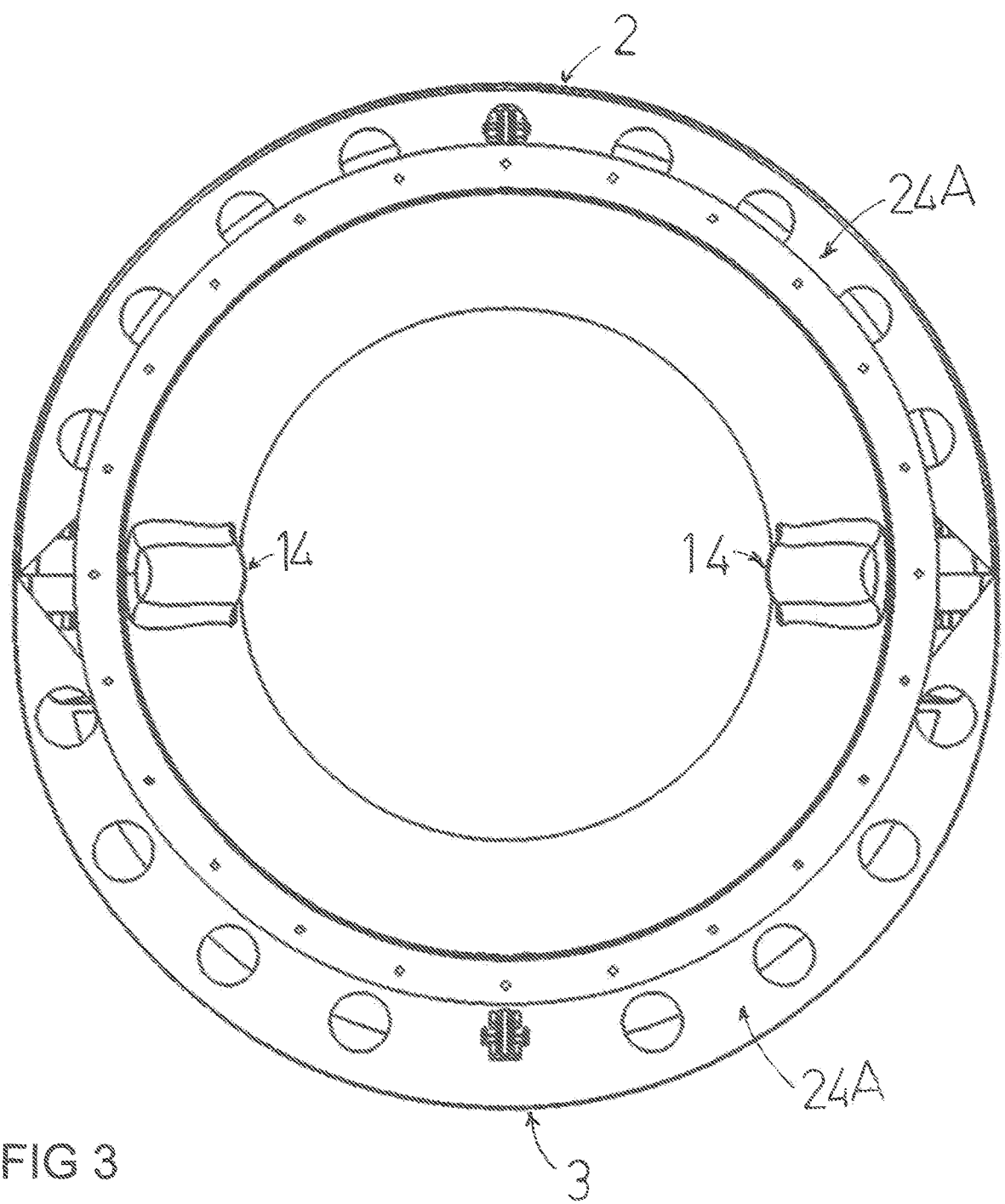
FIG. 3 represents a forward looking aft through the tailpipe, the blisters, the upper and lower doors.
Figure 23:
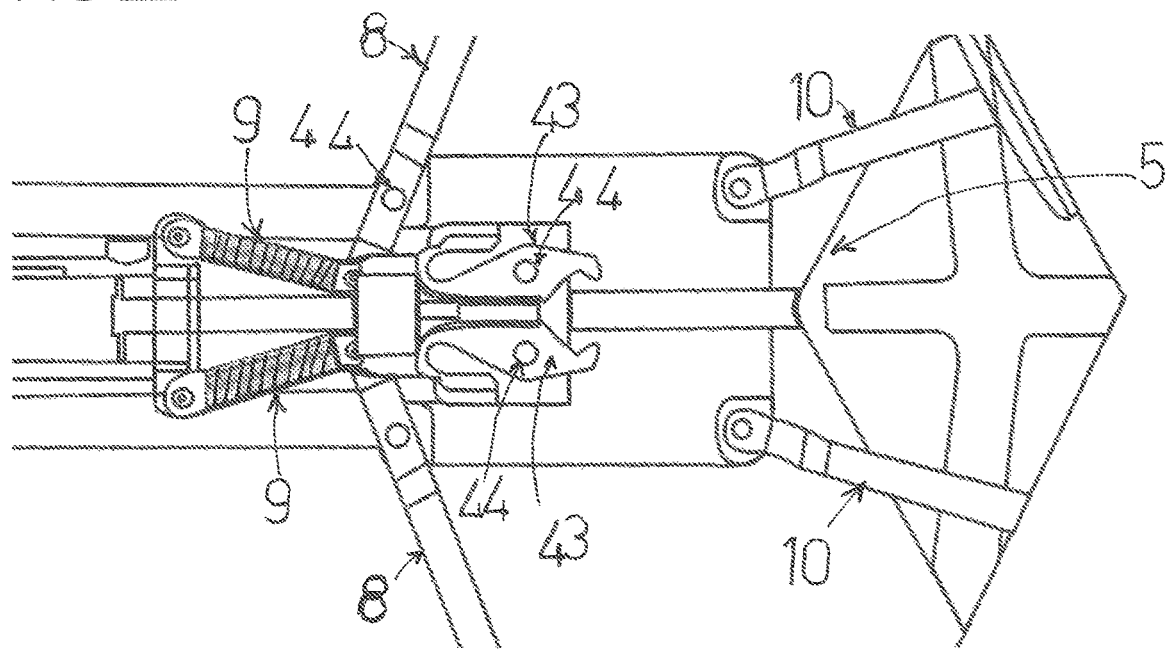
FIG. 23 illustrates the electro-mechanical locking mechanism, the hooks in the deploy position along with the door deploy linkage mechanism consisting of the AIA, the high-strength compression spring and the driver links FIG. 24 assuming transparent door and movable fairing, shows the electro-mechanical locking mechanism in the stow position the hooks in the stow position lodged in the target doors tabs and the movable fairings tabs along with the door deploy linkage mechanism consisting of the MA, the high-strength compression springs buckled under load, driver and trailing links and solenoid
Figure 24:
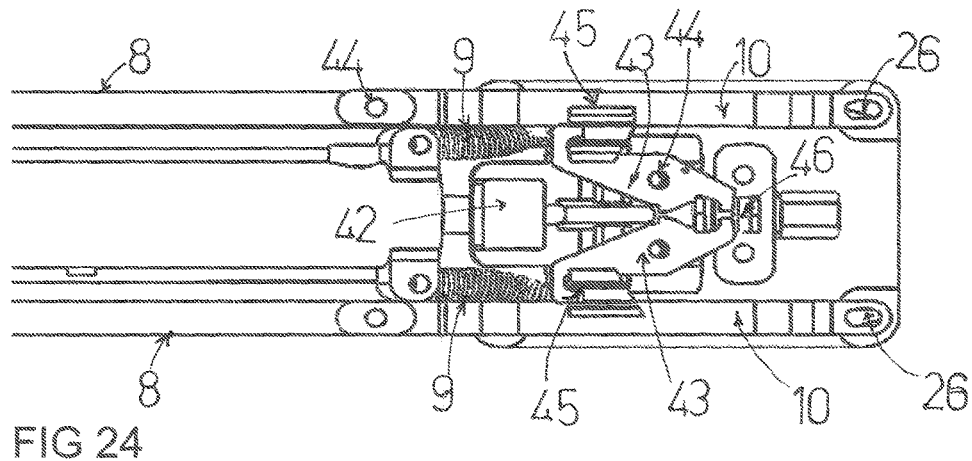

In reverse thrust mode of operation, THE ULTRA QUIET SPLIT FLOW ULTRA THRUST REVERSER will be deployed as shown in FIG. 2 with the tailpipe 1 shown with the locking rolling or fixed body 6 shown, a rolling wheel lock is shown for the sake of discussion, the target doors 2 and 3, the movable fairing 5 translating axially to cover the gap between the tailpipe and the doors but allowing free stream to be ram scooped in the gap between the outboard side of the movable fairing and the target door inboard surface. Two ACTUATOR-IN-ACTUATORs (AIA) 7 lodged in blisters 14, one on each side of tailpipe 1. The AIA's 7 are mounted to the tailpipe 1, on each side, at attachment lug 1B, connected to high strength compression spring 9, which in turn is joined to the driver link 8 through a hole 26A as shown in FIGS. 23 and 24. Each target door is also joined to the tailpipe 1 through two trailing links 10, one on each side of the tailpipe 1.

Figure 4:
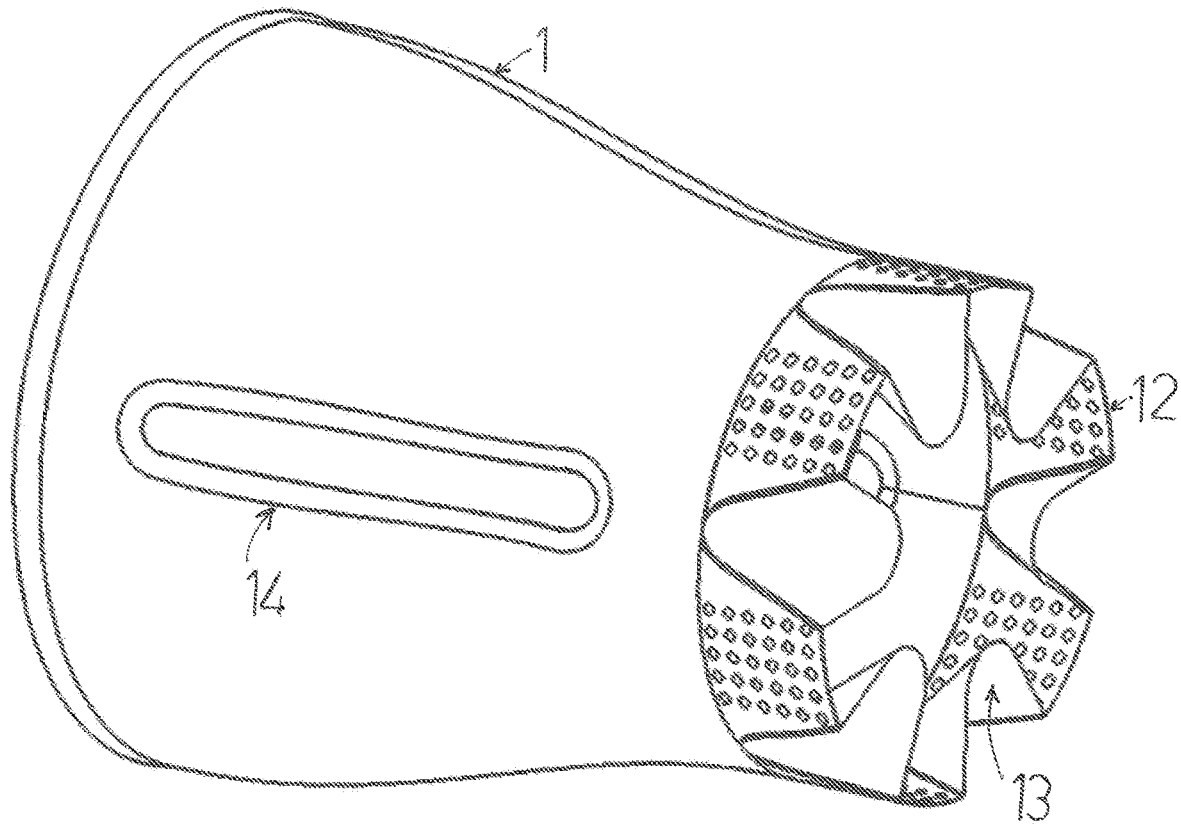
FIG. 4 illustrates an isometric view of the tailpipe with the exit mixer with perforations on the crown sections of the mixer and non-perforated flutes
Figure 6:
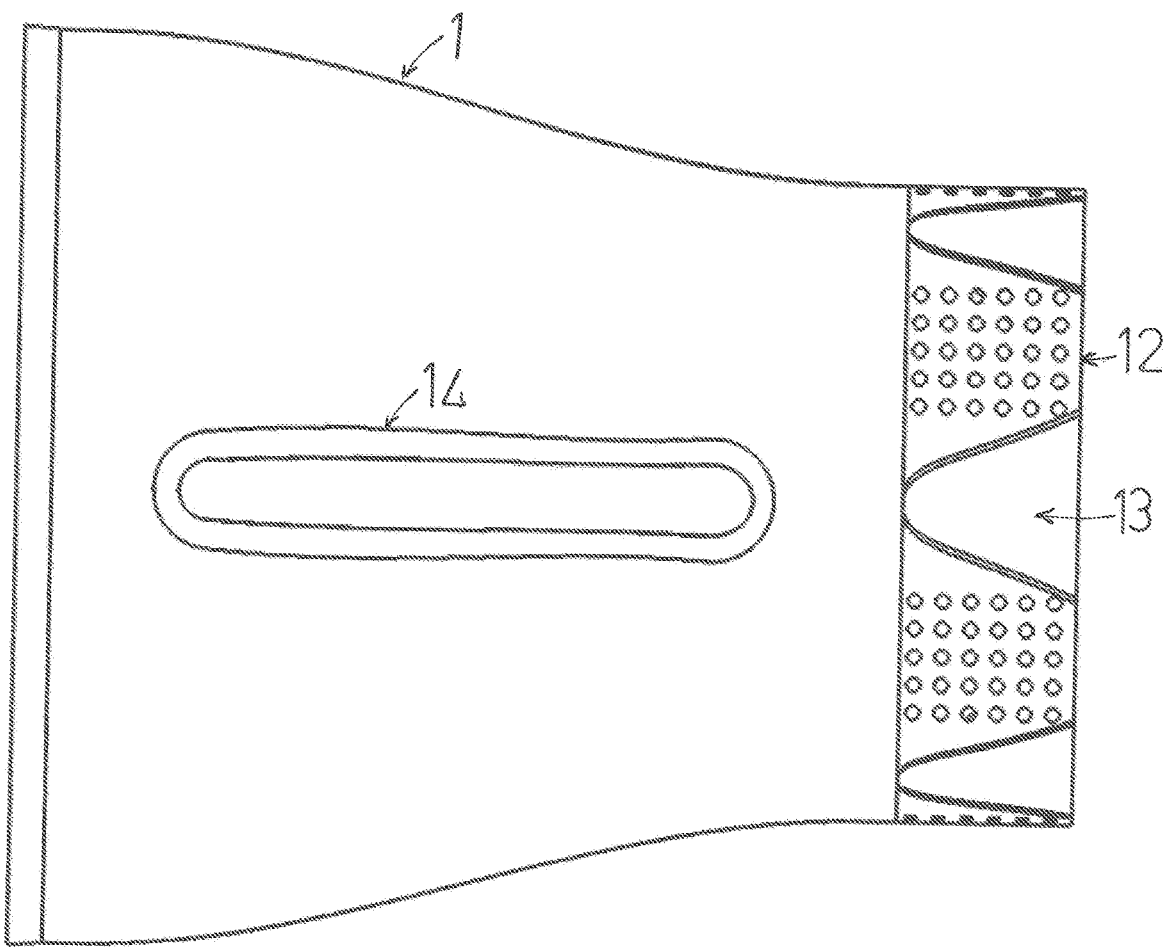
FIG. 6 illustrates a side view of the tailpipe with the exit mixer with perforations on the crown sections of the mixer and non-perforated flutes
Figure 7:
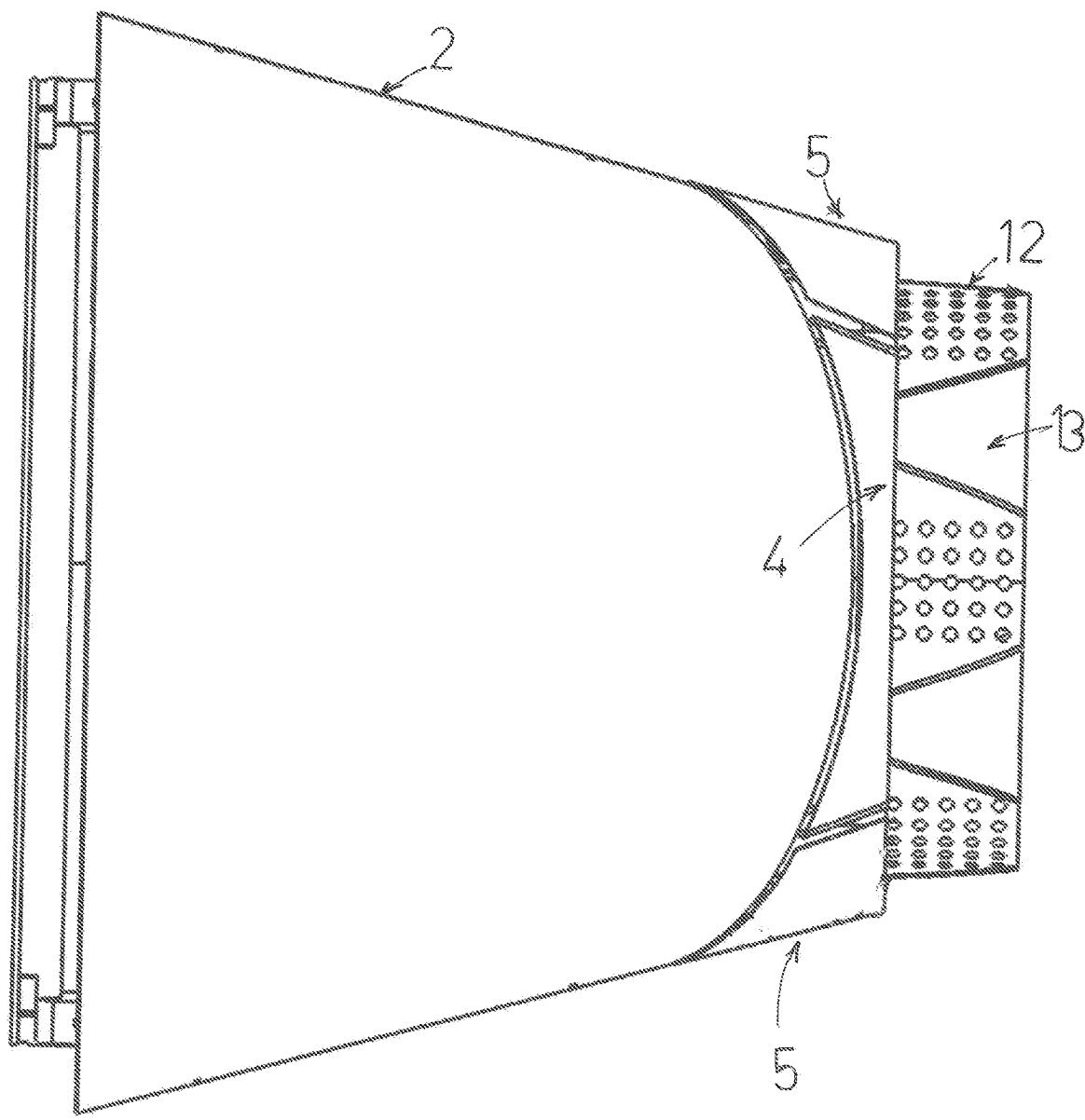
FIG. 7 illustrates a top view of THE ULTRA QUIET SPLIT FLOW ULTRA THRUST REVERSE in the stowed position showing the upper target door, the fixed and movable fairings and the exit mixer with perforations on the crown sections of the mixer and non-perforated flutes

Noise attenuation embodiments are included in the tailpipe 1 in FIG. 4, FIG. 6 and FIG. 7 in the form of an exit nozzle mixer 12 combination with drilled perforations on the outer surfaces directly exposed to the free stream, with no drilled perforations on the flutes 13 in the shown configuration. The drilled perforations aim at aspirating the free stream into the exit nozzle due to suction induced by the lower static pressure of the engine exit gases due to their high velocity thereby reducing the exit gases velocity locally by reducing shear noise between the exit gases and ambient free stream. The flutes 13 can also perforated in another configuration if need be. Drilled perforations will be customized for each application to achieve the optimum noise attenuation The perforated mixer nozzle extensive perimeter aims also at increasing the contact between the engine exit flow gases and ambient free stream compared to a typical circular exit section, to reduce noise induced by shear between the high velocity exit gases and ambient free stream.

Figure 5:
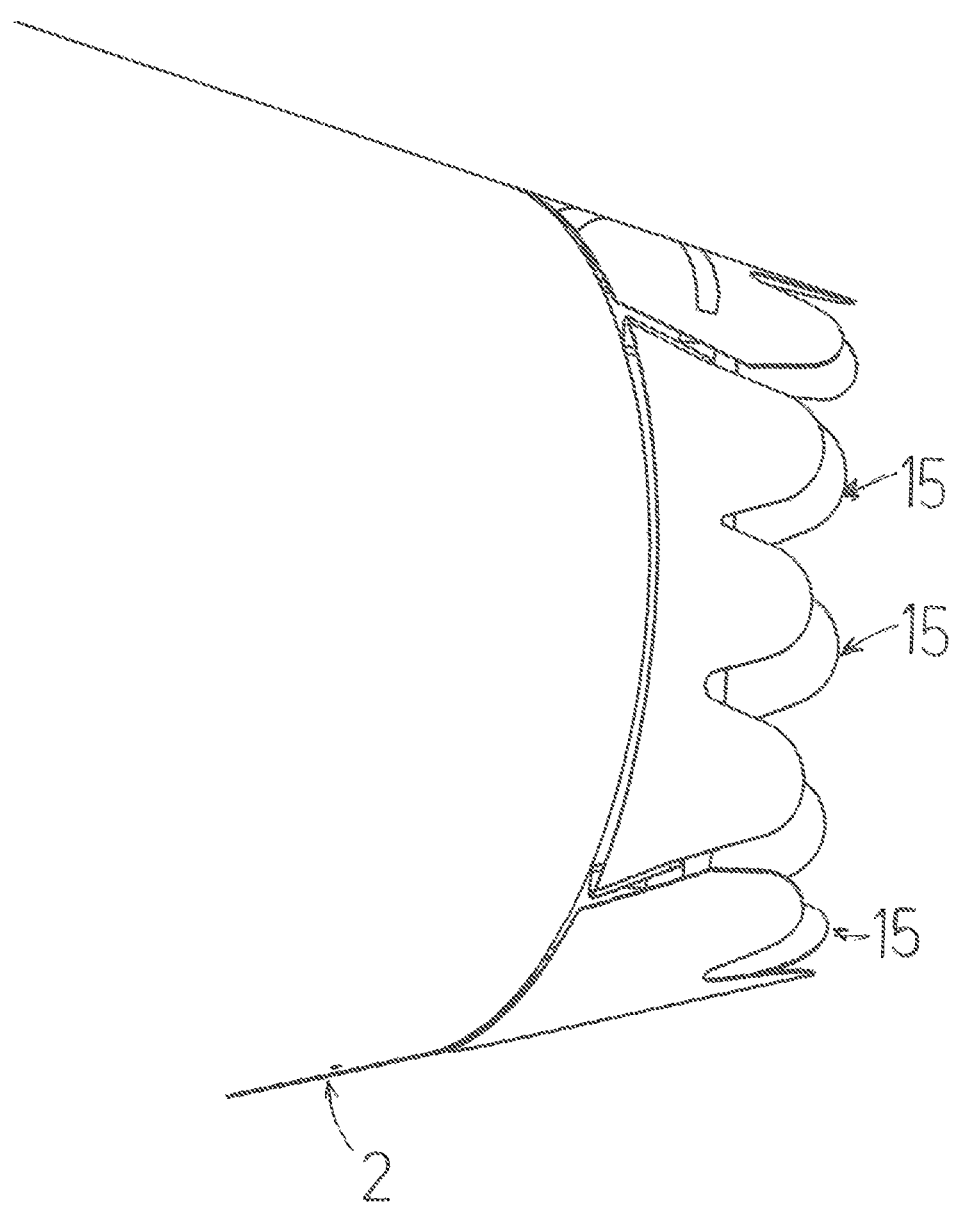
FIG. 5 illustrates the fixed and movable fairings with scalloped edges
Figure 8:
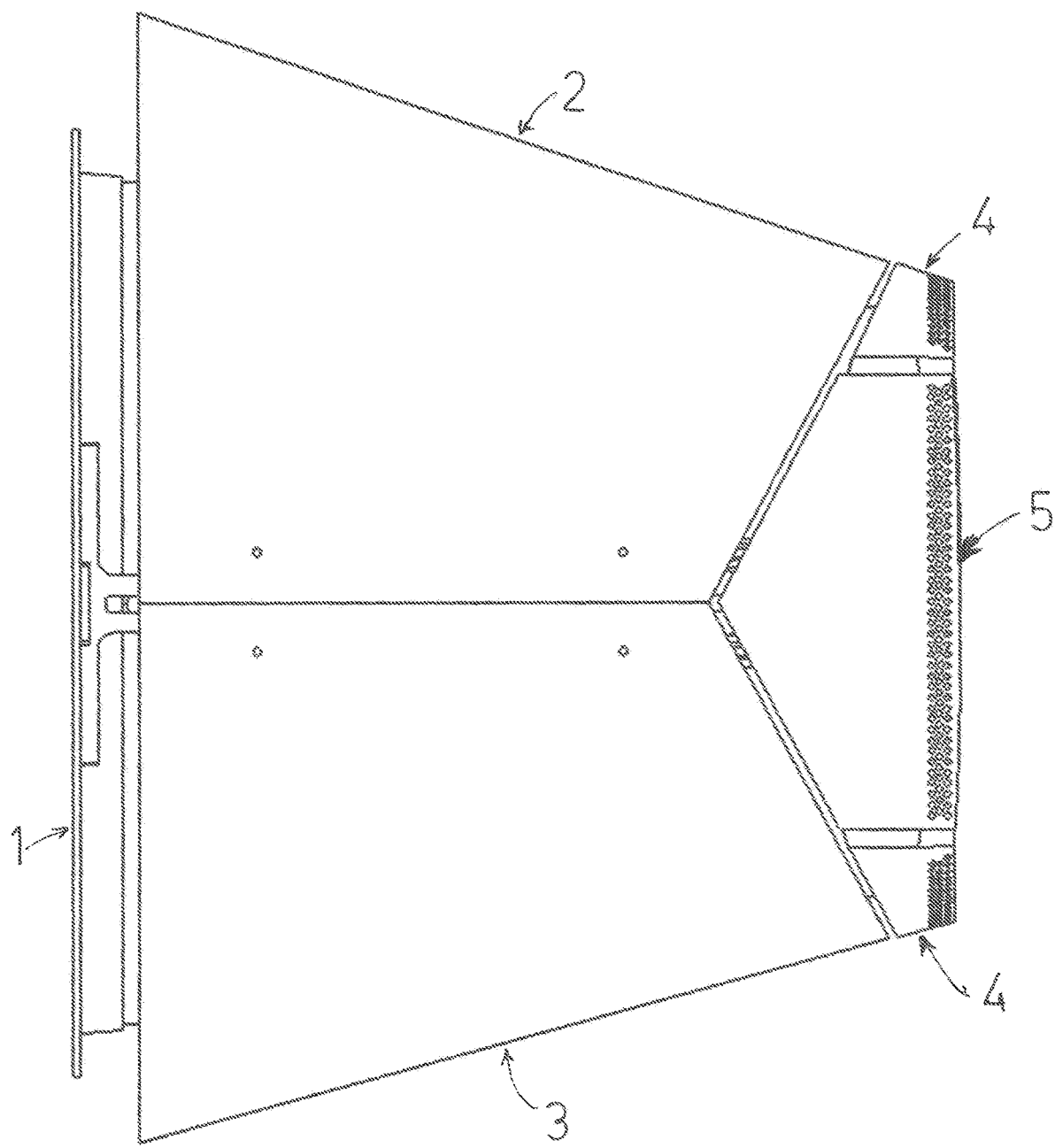
FIG. 8 illustrates a side view of THE ULTRA QUIET SPLIT FLOW ULTRA THRUST REVERSE in the stowed position showing the target doors with perforated trailing edges of the movable and fixed fairings
Figure 9:
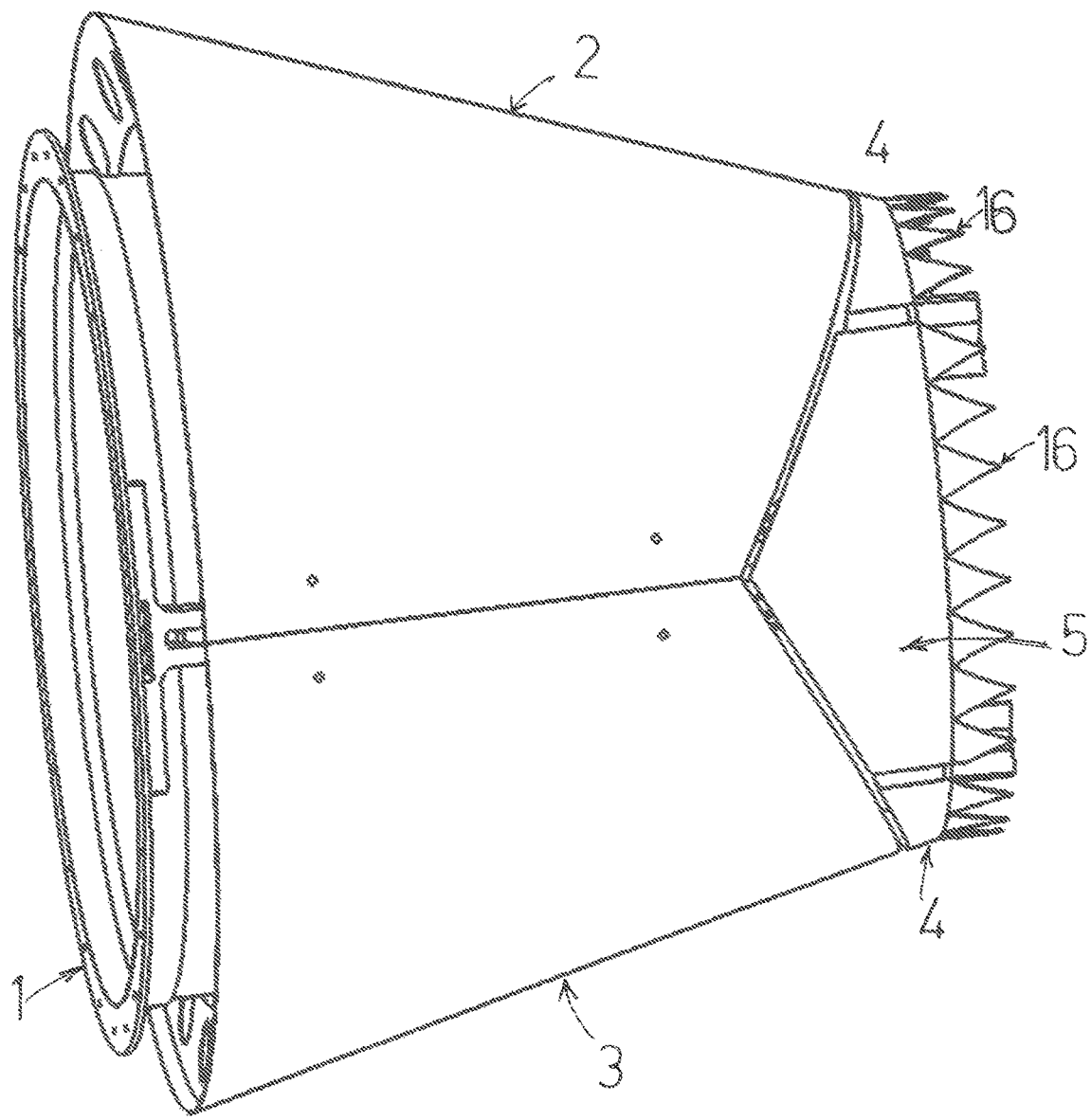
FIG. 9 illustrates a side view of THE ULTRA QUIET SPLIT FLOW ULTRA THRUST REVERSE in the stowed position showing, the fixed and movable fairings with chevrons

Additional noise attenuation embodiments are incorporated in the trailing edges of the fixed fairings 4 and the movable fairings 5 in the form of scallops 15 in FIG. 5 to increase the contact area between the engine high velocity exit flow gases and ambient free stream to reduce noise induced by shear between the higher velocity exit gases and ambient free stream. Alternate noise attenuation in FIG. 8 is drilled perforations on the fixed and movable fairings 4 and 5 respectively to aspirate the free stream into the adjacent engine exit gases due to the reduced static pressure of the engine higher velocity exit gases hence reducing the exit gases velocity locally thereby reducing shear noise between the exit gases and ambient free stream. THE ULTRA QUIET SPLIT FLOW ULTRA THRUST REVERSER design can also lend itself to the use of chevrons 16 in FIG. 9 to be incorporated at the trailing edges of fixed and movable fairings 4 and 5 respectively.

Figure 10:
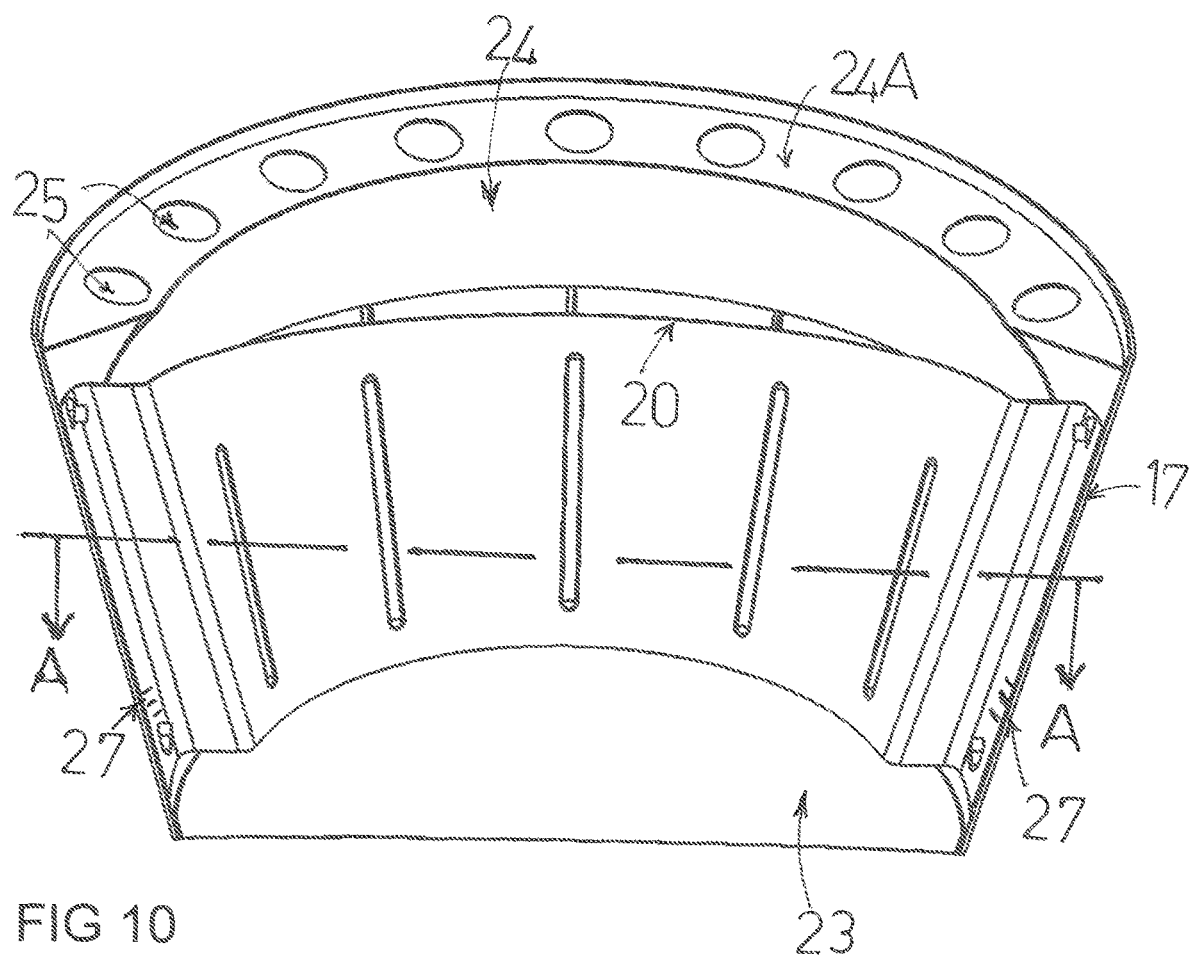
FIG. 10 illustrates a split flow target door showing primarily the inner skin, split flow inlet and exit frames and the inlet arid exit ramps and the forward frame
Figure 11:
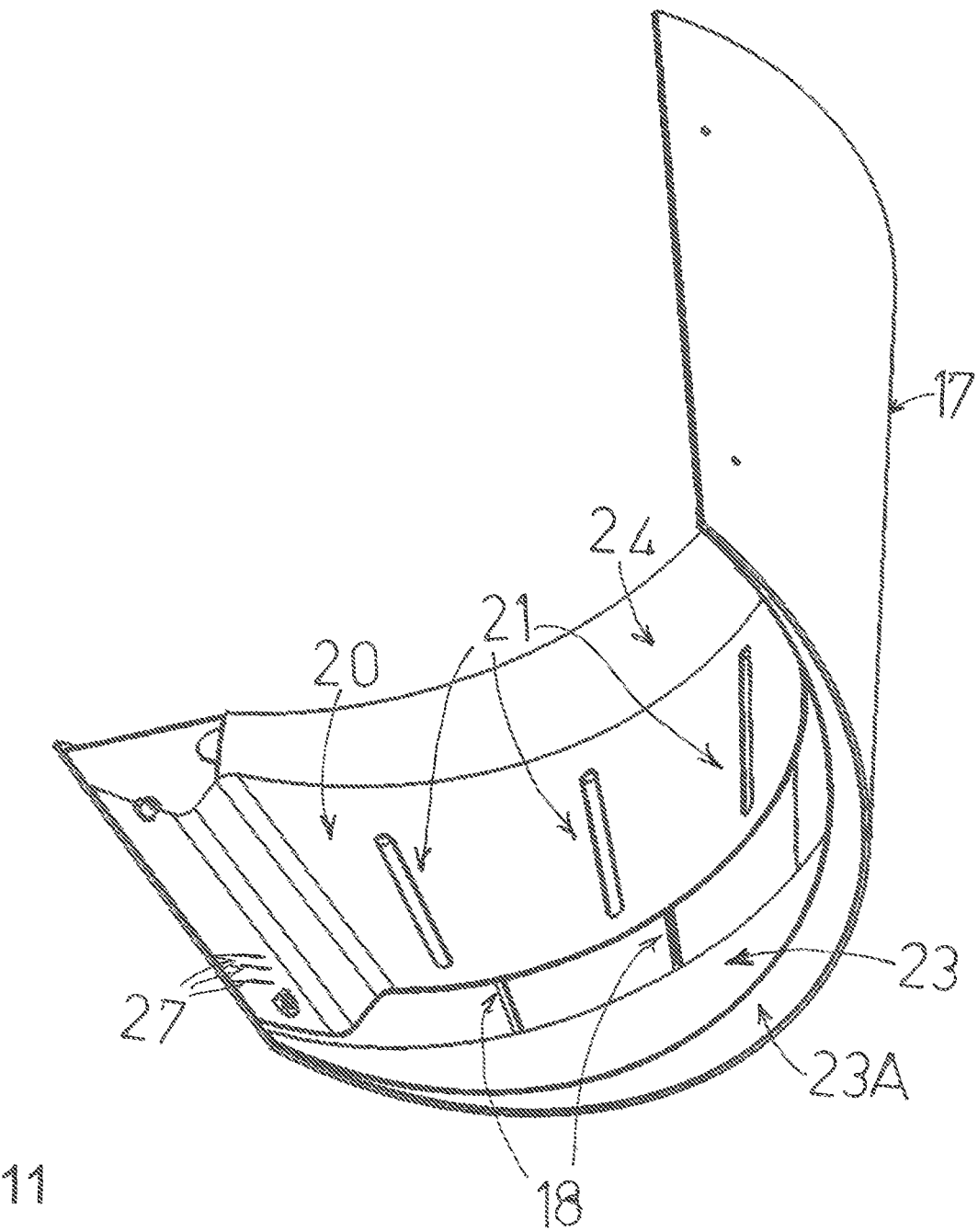
FIG. 11 illustrates a split flow target door showing the stiffening angles on the outer skin, the inner skin and the inlet and exit ramps
Figure 12:
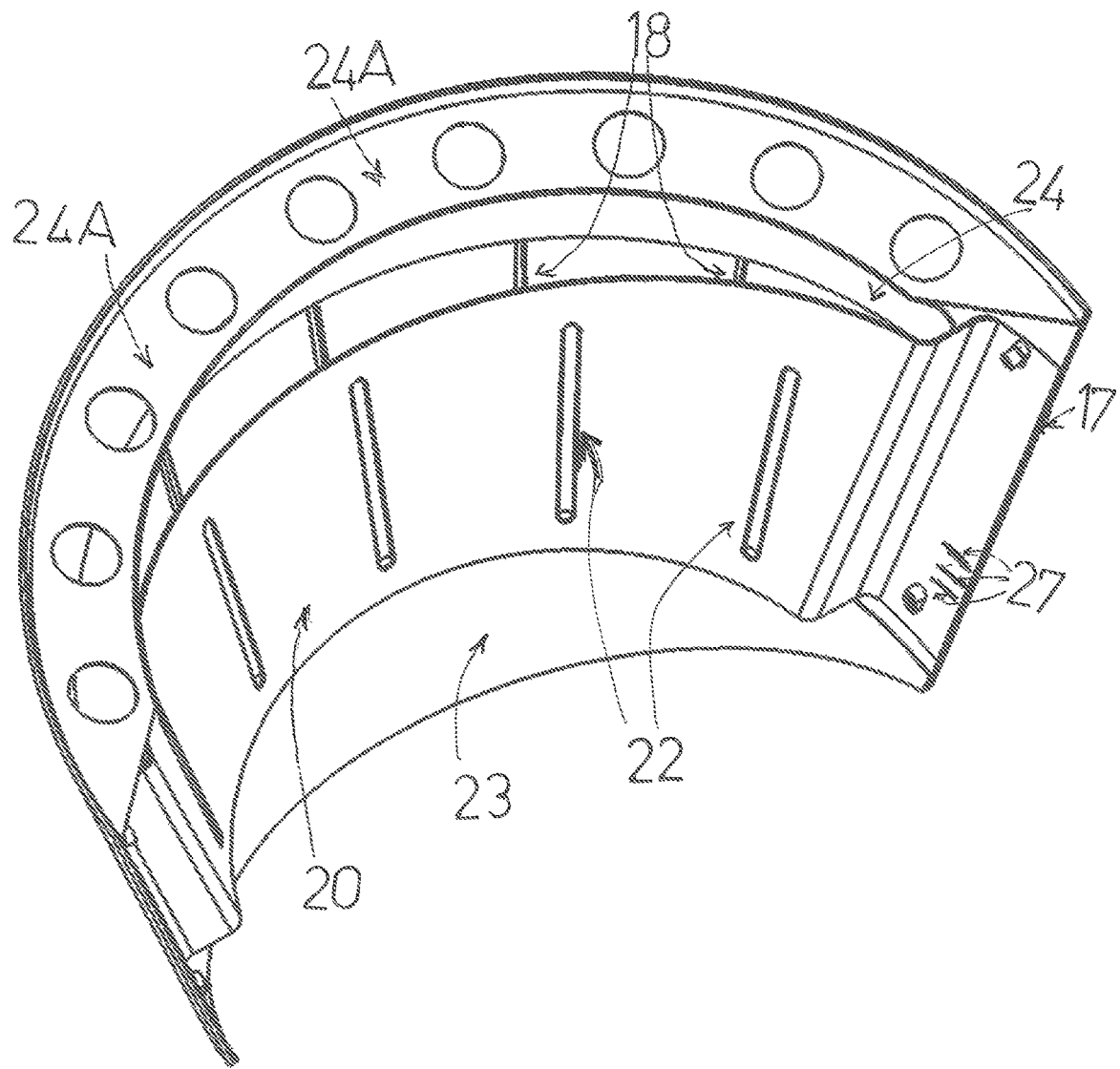
FIG. 12 illustrates a split flow target door, the front frame, the inner skin, outer skin and the inlet and exit ramps
Figure 14B:
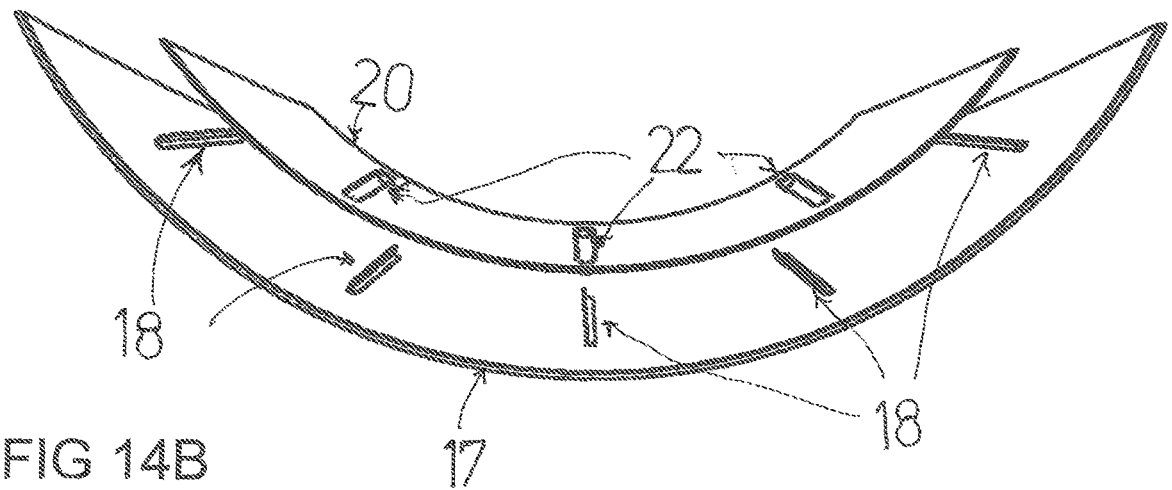
FIG. 14B illustrates the other target door configuration where the inner and outer skins are stiffened by either angles or stiffening longitudinal grooves, also called beads

THE ULTRA QUIET SPLIT FLOW ULTRA THRUST REVERSE has two split flow clamshell target door design configurations shown in FIGS. 10, 11 and 12. The split flow target doors consist of an outer skin 17 with longitudinal angles 18 which can be L-shaped or T-shaped or any other appropriate angle shape to provide stiffness and prevent buckling of the door outer skin under aerodynamic loads inflight. The inner skin 20 joins the outer skin along the longitudinal edges of the split flow target door, The inner skin can be stiffened using longitudinal angles 21 or dimples 22 dented longitudinally into the inner skin, also can be called beads as shown in FIG. 14B. A second split flow target door configuration consists of the outer skin 17 and several plates 19 as shown in FIGS. 13 and 14A joining the outer skin 17 to the inner skin 20 forming channels for the split flow to flow through them in reverse thrust mode when THE ULTRA QUIET SPLIT FLOW ULTRA THRUST REVERSER is deployed. The longitudinal angles 18 can be made to join the split flow inlet ramp 23 and exit ramp 24 shown in FIG. 10, FIG. 11 and FIG. 12. The inside of the target doors 2 and 3 can be fitted with guide vanes 27 to direct the ram scooped ambient air during reverse thrust mode of operation towards the door inlet ramp to mitigate the effect of the hot engine exhaust gases and to increase the total reverse thrust mass thereby increasing total reverse flow momentum and provide a cool layer of air to shield the inlet ramp 23.

Figure 15:
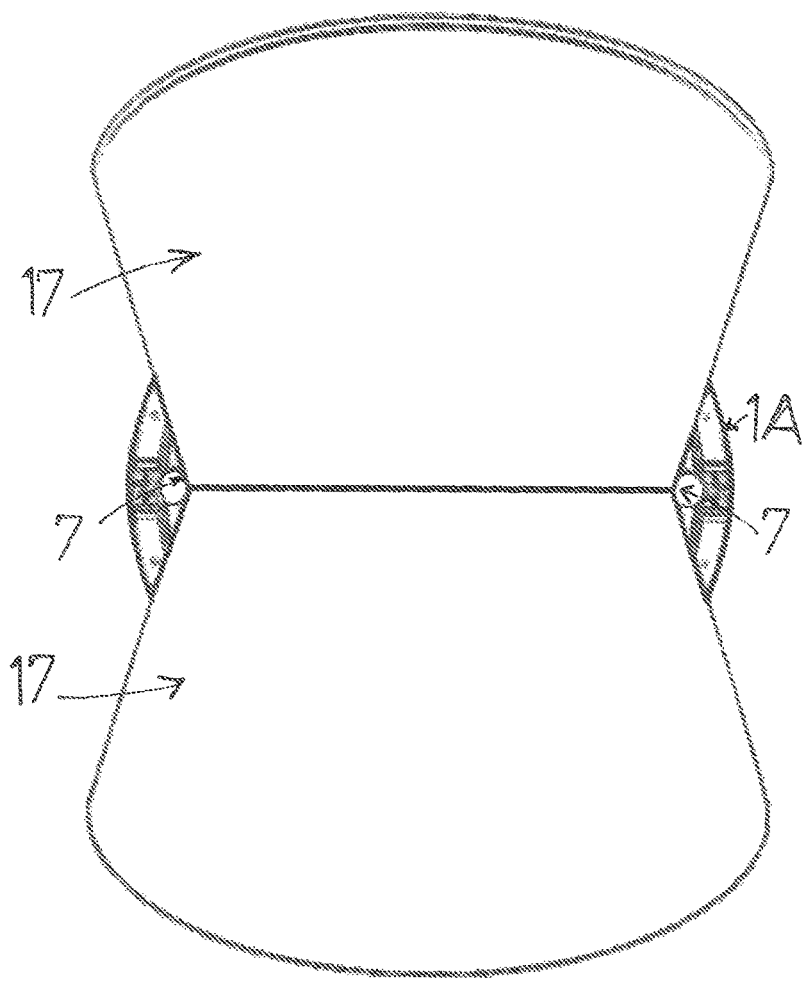
FIG. 15 illustrates the ULTRA THRUST REVERSE in the deploy position, aft looking forward showing the target doors outer skins.
Figure 16:
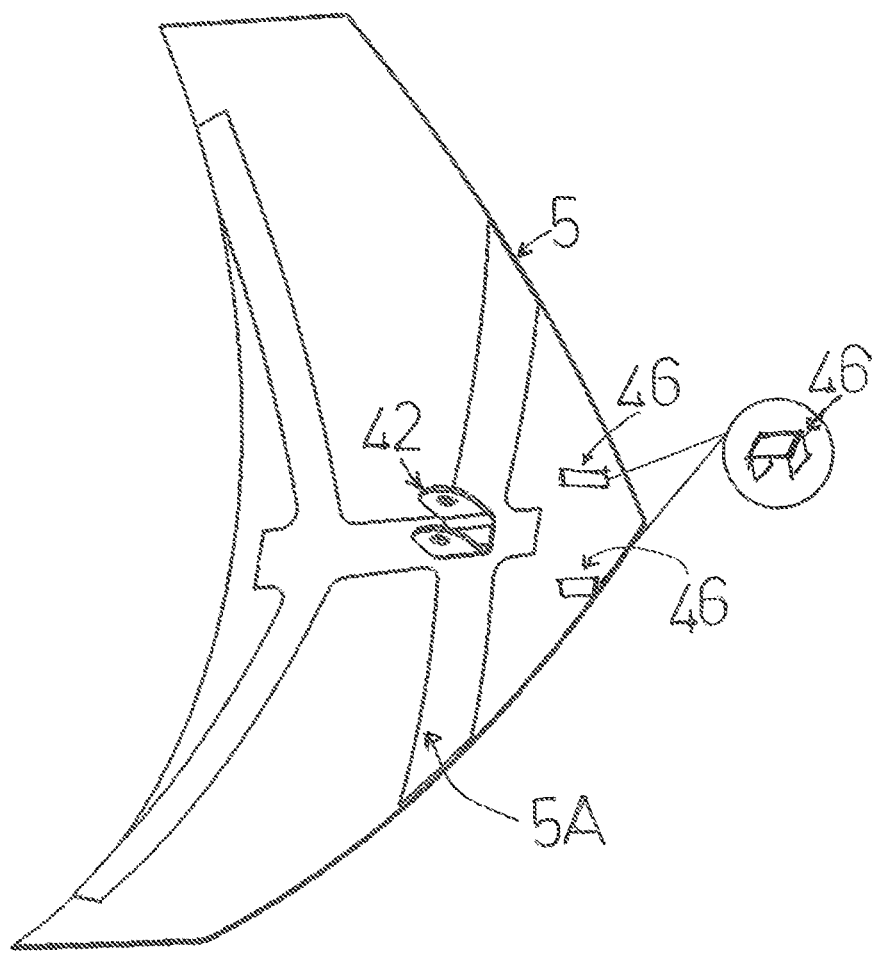
FIG. 16 illustrates the movable fairing with the stiffener plate, the attachment lug to the AIA piston and S-Locks tabs
Figure 17:
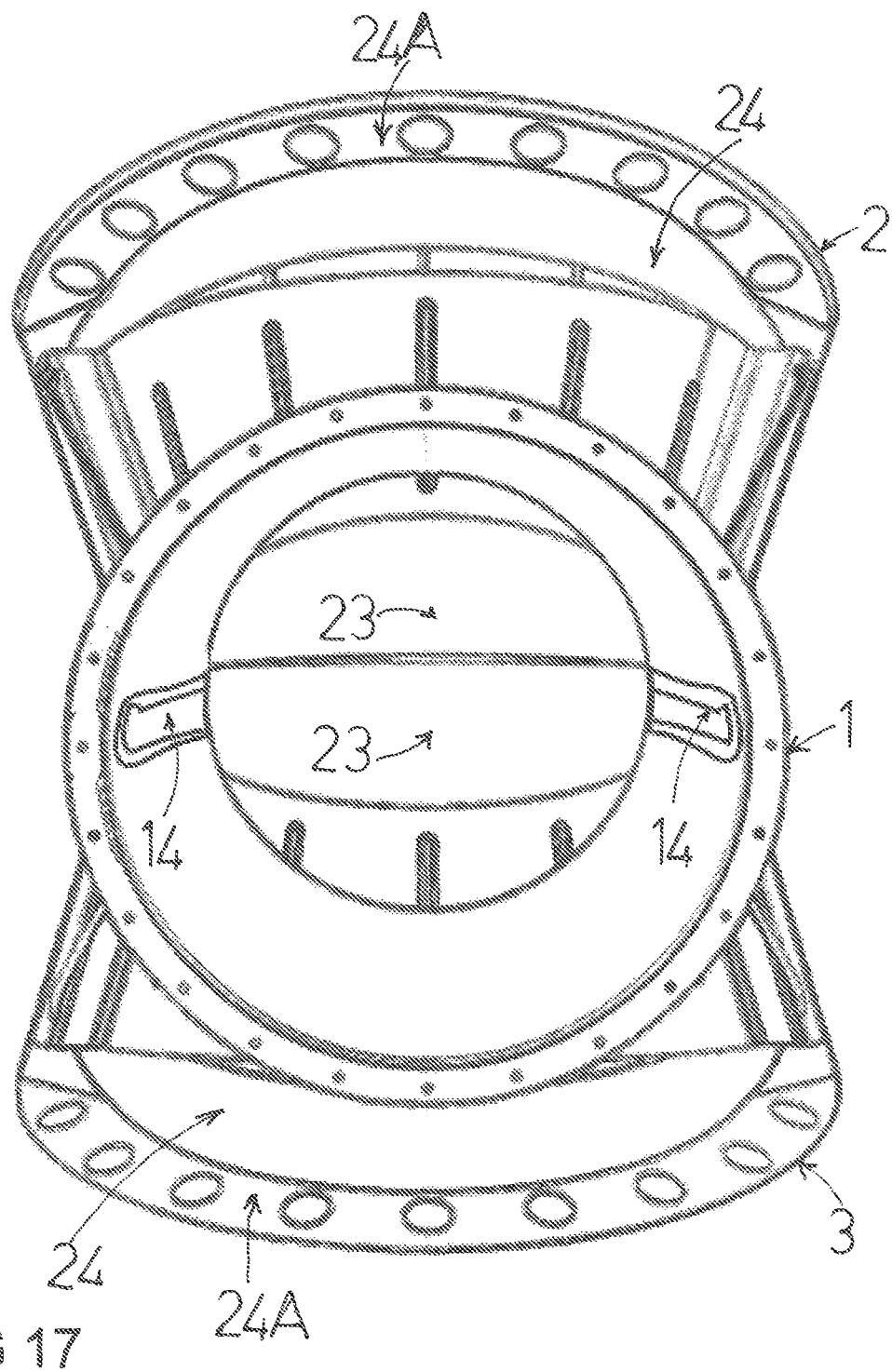
FIG. 17 illustrates the ULTRA THRUST REVERSER, forward looking aft in the deploy position
Figure 18:
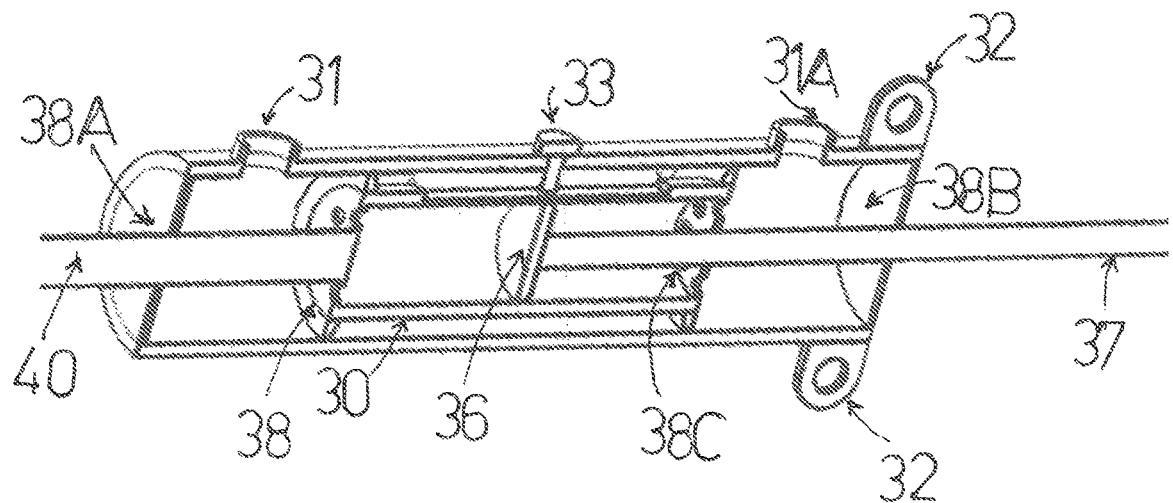
FIG. 18 illustrates a cross-section of the ACTUATOR-IN-ACTUATOR (MA) showing the stow and deploy ports, outer cylinder with lugs, inner cylinder with piston used to deploy the movable fairing
Figure 19:
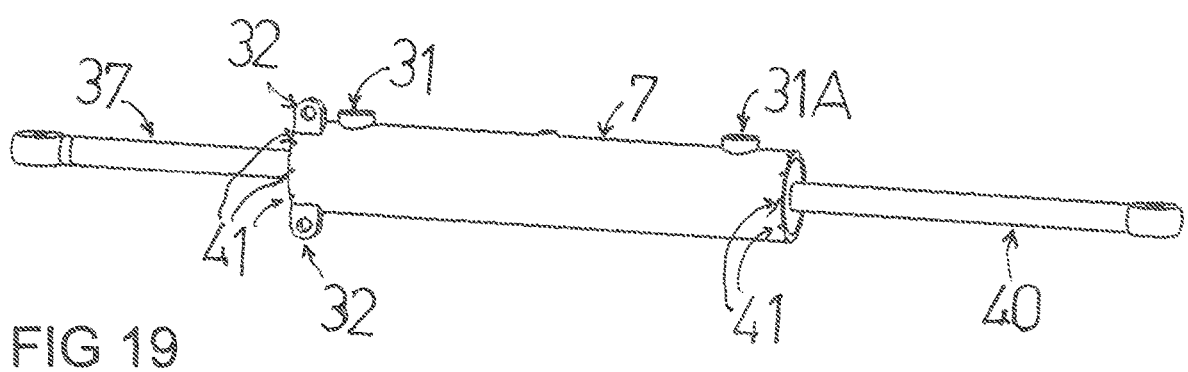
FIG. 19 illustrates the AIA with the lugs and hydraulic fluid ports and piston rod
Figure 20:
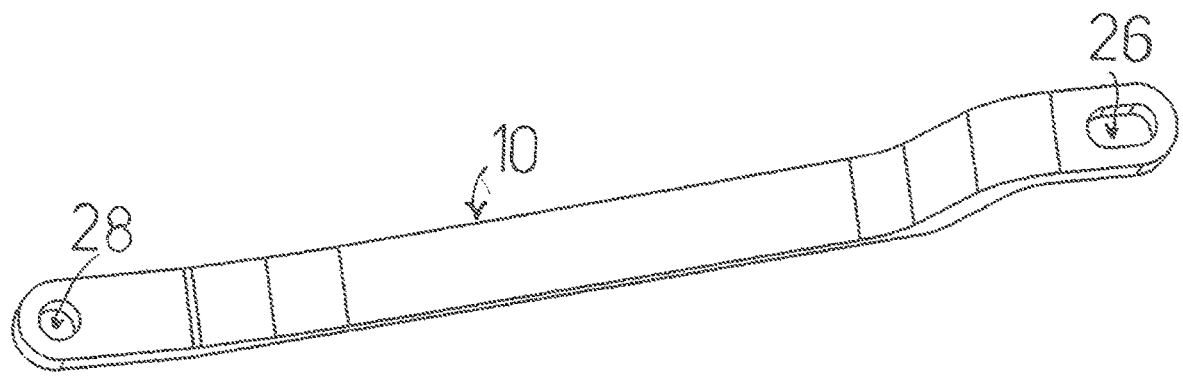
FIG. 20 illustrates the trailing link with the elongated pivoting slot
Figure 21:
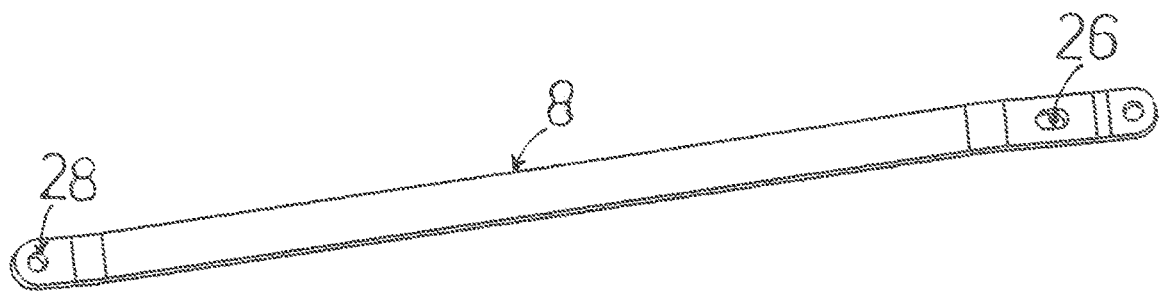
FIG. 21 illustrates the driver link with the elongated pivoting slot
Figure 22:
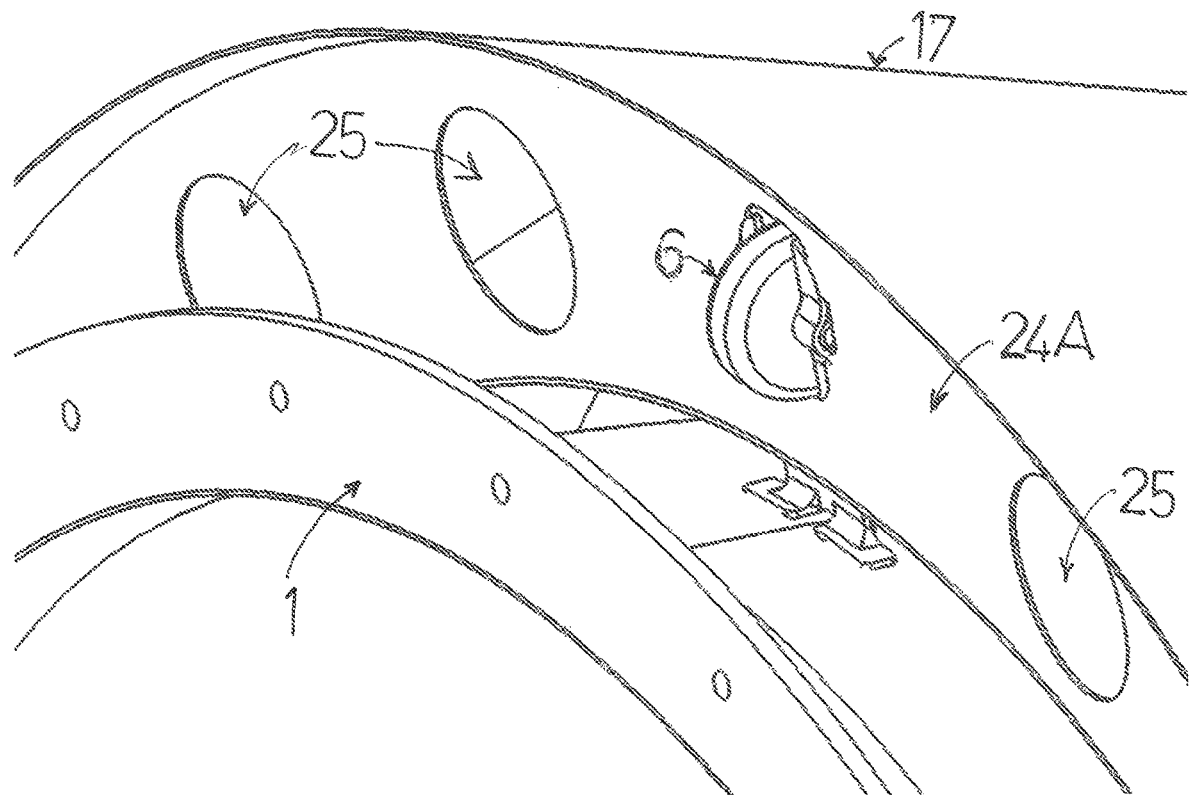
FIG. 22 illustrates the target door front frame with the locking rolling body, wheel, lodged in one of the slots of the frame and the tailpipe mounting flange

At the aft end of the split flow target door is the inlet ramp 23 of the split flow which also serves as a structural frame for the split flow target door where the aft end of the outer skin 17 is joined. The inlet ramp flat portion 23A is used as a bumper contact surface when the target doors are deployed as shown in FIG. 15. The engine exit flow gases impact the inlet ramps of the target doors 2 and 3 where a portion flows between the inner skin 20 and the outer skin 17, while the remainder of the engine exit gases flows along the other side of the inner skin 20, The split flow exits at the exit ramp 24 at the front end of the target door. The exit ramp 24 serves as a forward frame to which the outer skin 17 is joined and also the stiffening links 18 can be joined to the forward frame exit ramp 24 to form a cage structure for the target door consisting of the outer skin 17, the inner skin 20, joined to the outer skin 17 longitudinal sides and the inlet ramp 23, to which the stiffening links 18 can also be joined. The second target door configuration consists of the exit ramp forward frame 24 at the front end of the target door and inlet ramp 23 at the aft end of the target door to which the outer skin 17 is joined, where the outer skin 17 has stiffening plates 19 joining the outer skin 17 to the inner skin 20 forming channels for the split flow to flow through them. The inner skin 20 and the outer skin 17 are also joined along the longitudinal edges of the target doors. The outer skin 17 is joined to, the inlet ramp 23 in this configuration as well. The forward frame exit ramp 24 has a vertical portion 24A which joins the outer skin 17. The vertical portion 24A can be solid or as shown with lightening holes 25 for weight reduction, one of these holes is used as shown in FIG. 22 as a locking system where the locking body or wheel 6 is lodged in the stow mode locking the target door in place in stow mode.

The target doors 2 and 3 are each linked to the tailpipe 1 through two driver links 8, one on each side, and two trailing links 10, one on each side. There are pivoting slots 26 instead of pivoting circular holes on the driver link 8 and the trailing link 10 which pivot around the pivots 26A. The pivoting slots 26 give the doors an axial translation degree of freedom to allow the actuator 7 during the stow cycle to push the target door aft thereby forcing a hole 25 to be lodged under the center of the locking body or wheel 6, or above the locking wheel in case of the lower door, thereby preventing the target doors from deployment and also causing the compression spring 9 to buckle under the actuator 7 force thereby exerting a force securing the target doors in the stow position to prevent inadvertent deployment, During deployment cycle, the actuator 7 moves forward unbuckling and dragging with it the compression spring 9 hence relieving the locking force on the target door and pushing the door forward thereby moving the edge of the hole 25 from under the locking body or wheel 6 allowing the target doors to rotate and deploy. The ends of the links have circular holes 28 to be bolted to the target doors forward end.

The third locking mechanism in FIG. 24 is electrically actuated using solenoid 42 which pushes two S-locks 43 where each pivot around a pin 44. The S-locks are each lodged in target door tab 45 and movable fairing tab 46 to provide redundancy. During deployment as shown in FIG. 23, the solenoid 42 is energized causing the S-locks to rotate around the pivot 44 freeing the target doors and the movable fairing to allow them to move under the force exerted by the AIA 7.

Figures 25, 26:
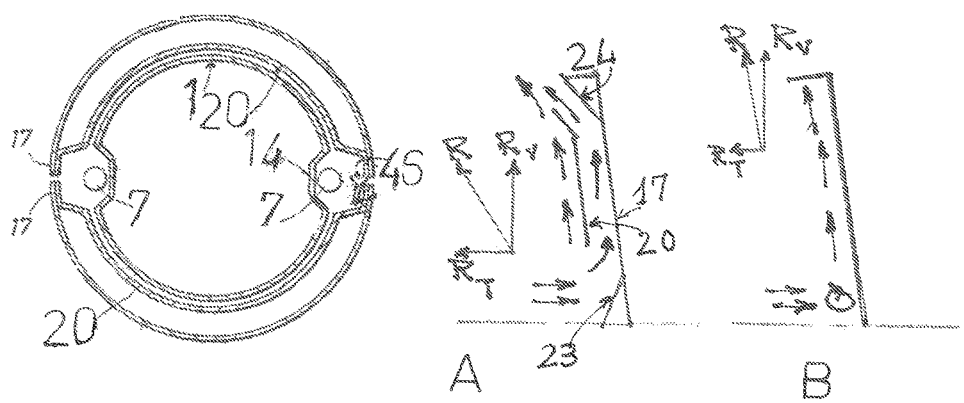
FIG. 25 shows a cross-section of the target door and tailpipe showing the underlap
FIG. 26 shows a depiction diagram of the reverse flow for the split flow target door and the conventional target door

FIG. 26 A shows a schematic representation of the split flow target door and the movement of the engine exhaust flow gases split where a portion flows between the outer skin 17 and inner skin 20 resulting in a flow resultant Rat around say 50° which is resolved into horizontal reverse thrust component $R_T=R \times \cos 50° 4I·67$ R and vertical component Ry=R sin 50°=0.76, FIG. 26 B depicts the engine exhaust gases impinging against a typical target door for current target thrust reversers designs which creates high turbulence zone at the lower end of the door due to the axial exhaust gases exiting the engine tailpipe smashing against the flow bouncing from the target door then flowing upward. This turbulence results in flow energy losses. The exhaust gases component R flows along the door at an angle of around 83° which is resolved into horizontal reverse thrust component $R_T=R \times \cos 83°=0.12$ R and vertical component Rv=R sin 80°=0.99 R. which shows that the reverse thrust efficiency, represented by $R_T$ of the split target door is several orders of magnitude greater than current target doors designs since its $R_T$ 60.67 R, compared to current designs with $R_T \times 0.12$ R. Having the resultant R at around say 50° aims at avoiding re-ingestion of the reverse flow gases by the engine. The higher $R_v$ component of the current target doors designs in comparison with the split flow target door does adversely affect the horizontal tail for aft mounted engines resulting in what is known as rudder blanking which impairs the pilot ability to directionally control the aircraft on the ground during reverse thrust mode which can result in airplanes accidents. THE ULTRA QUIET SPLIT FLOW ULTRA THRUST REVERSER mitigates rudder blanking due to the relatively lower R component.

FIG. 25 shows a cross-section through the target doors, the tailpipe 1 and the actuator 7 to show the underlap 46 feature to prevent reverse flow exhaust gases impingement on the fuselage or any of the aircraft surfaces by adding an extension to the inner skin 20, on the inboard or outboard sides of the door. FIG. 25 shows the underlap on one side only.

On the ground, the pilot commands thrust reverser deployment which sends an electric signal to the solenoids 42 on both sides of the tailpipe 1 which in turn allow the S-locks 43 on both sides of the tailpipe to rotate around the pivot 44 clearing the tabs 45 and 46 of the target doors 2 and 3 and the moving fairings 5 respectively, The hydraulic fluid under pressure enters through orifice 31 to fill the forward chamber of the hydraulic actuator 7, exerting hydraulic pressure force pushing against the cover 38A of the outer cylinder 29 causing it to move forward under pressure along the rod 40 and cover 38B will move along Rod 37. Covers 38 and 38A are pinned in place using pins 41. The hydraulic fluid flows also through orifices in cover 38 into the inner cylinder 30 exerting hydraulic pressure force against the piston 36 which is connected the movable fairing 5 at the lug 42 causing the movable fairing 5 to move aft to close the gap between the thrust reverser target doors 2 and 3 and the tailpipe 1 to assure that all reverse flow gases are enclosed and not leaking laterally impinging on the aircraft fuselage or other surfaces, but contained to cause the desired reverse thrust and aircraft deceleration. The movement forward of the outer cylinder 29 with the lugs 32 relieves the compression buckling force on the spring 9 allowing the target doors to clear the locking body or wheel then start rotating around the pivoting point 26A where the longitudinal slots 26 of the driver links and trailing links 8 and 10 respectively allow the door to translate forward thereby pushing the hole 25 from under the rolling body or wheel 6 allowing the target doors to rotate and deploy freely as shown in FIG. 1. The hydraulic fluid in the back side of piston 36 will be forced into the aft chamber of the actuator 7, which in turn due to the forward motion of the outer cylinder 29 and the ensuing decrease in volume of the aft chamber, will force the hydraulic fluid to flow through orifice 31A into the return line of the hydraulic system of the aircraft.

During the thrust reverser stow operation, the reverse operation will occur, the hydraulic fluid under pressure will enter through orifice 31A filling the aft chamber of the hydraulic actuator 7, exerting hydraulic pressure force pushing against the cover 38B of the outer cylinder 29 causing it to move aft along the rod 37 and cover 38A will move along Rod 40. The hydraulic fluid flows also through orifices in cover 38C of the inner cylinder 30 exerting hydraulic pressure force against the piston 36 back face which is connected to the movable fairing 5 causing the movable fairing 5 to retract forward to rest against the thrust reverser doors 2 and 3 in the forward thrust position as shown in FIG. 1. The movement aft of the outer cylinder 29 causes the lugs 32 which are connected to the compression springs 9 to move aft causing the driver links 8 and the trailing links 10 to pivot around 26A to stow the thrust reverser doors as shown in FIG. 1 and to force the forward frame 24A to slide along the locking body or rolling wheel 6 until the end of the AIA 7 stroke which pushes the forward frame slot 25 under the locking body or rolling wheel 6 to be tucked in line with the axis of rotation of the wheel 6 to prevent the target doors from deploying. The end of stroke of actuator AIA 7 causes the compression spring to buckle forcing the target doors 2 and 3 down in the stow position for forward flight. Then the solenoid 42 is de-energized allowing the S-locks 43 to pivot around the pivoting point 44 to be embedded in tabs 45 and 46 of the target doors 2 and 3 and moving fairings 5 respectively to secure the doors in the stow position.

The foregoing disclosure and description of the invention are illustrative and explanatory thereof, and various changes in the size, shape and materials, as well as in the details of the illustrated system may be made without departing from the spirit of the invention.

What is claimed is:

1. A thrust reverser system for jet engines comprising:
   a tailpipe having an internal surface in contact with engine gas flow and an outer surface, wherein the tailpipe has a front end and an aft end;
   a pair of actuator-in-actuators disposed on the tailpipe;
   a pair of clamshell-type doors comprising longitudinal edges and configured to fully surround the tailpipe when in a stowed position,
   a pair of driver links each connected to a corresponding clamshell type-door of the pair of clamshell-type doors;
   two fixed and two moveable fairings disposed proximate to the aft end of the clamshell-type doors and configured to reduce aerodynamic drag;
   a first locking arrangement disposed on a first side of the tailpipe;
   a second locking arrangement disposed on a second side of the tailpipe;
   wherein each of the first locking arrangement and the second locking arrangement comprise:
      a rolling or fixed body lock disposed proximate to the front end of the tailpipe;
      a compression spring in mechanical communication with one of the pair of actuator-in-actuators and one of the pair of driver links;
      a pair of S-shaped hooks with a first end and a second end disposed on the aft end of the tailpipe and in mechanical communication with one of the pair of clamshell-type doors at the first end and one of the moveable fairings at the second end; and
      a solenoid configured to actuate the pair of S-shaped hooks.

2. The thrust reverser system of claim 1 wherein each clamshell-type door comprises:
   an inboard panel extending along and between the longitudinal edges of the door;
   an inlet ramp disposed at the front end of the inboard panel;
   an exit ramp with a vertical portion disposed at the back end of the inboard panel; and
   an outboard panel connected to the inlet ramp and the exit ramp forming an annular channel between the inboard panel and the outboard panel,
   wherein the vertical portion has a plurality of openings.

3. The thrust reverser system of claim 2, wherein the inlet ramp is configured to split the engine gas flow, when the clamshell-type doors are in a deployed position, into a first flow through the annular channel and a second flow along the surface of the inboard panel opposite the annular channel the first flow is guided by the exit ramp to rejoin the second flow by the exit ramp, where the exit ramp is configured to form a resultant shallow angle flow that reduces turbulence in engine gas flow exiting the tailpipe and produces a higher horizontal reverse thrust force component.

4. The thrust reverser system of claim 3, each of said clamshell-type door outboard panels comprising longitudinal stiffening angles.

5. The thrust reverser system of claim 3, said clamshell-type doors comprising guide vanes, wherein the guide vanes are configured to direct ambient air flow towards the inlet ramp.

6. The thrust reverser system of claim 3 each of said clamshell-type doors inboard panels comprising longitudinal stiffening dimples.

7. The thrust reverser system of claim 3, each of said clamshell-type doors inboard panels comprising longitudinal stiffening angles.

8. The thrust reverser system of claim 3, each of said clamshell-type doors inboard panels comprising a lateral underlap surface to prevent lateral impingement of exhaust gases on aircraft surfaces.

9. The thrust reverser system of claim 1, wherein the pair of clamshell-type doors are semi-circular.

10. The thrust reverser of claim 1, wherein each of the pair of driver links comprises at least one pivoting slot configured to enable the clamshell-type doors to translate and rotate around the respective pivots.

11. The thrust reverser system of claim 1, wherein the each of the pair of actuator-in-actuators is configured to translate the corresponding clamshell-type door under the rolling or fixed body lock mounted on the tailpipe to securely lock said clamshell-type doors in the stow position.

12. The thrust reverser system of claim 1, wherein the fixed fairings' trailing edges are shaped like scallops to increase contact with ambient air to reduce acoustic signature.

13. The thrust reverser system of claim 1, wherein the fixed fairings' trailing edges are have holes to educt ambient air by the engine exhaust gases to reduce noise signature.

14. The thrust reverser system of claim 1, wherein the fixed fairings' trailing edges are fitted with chevrons to increase contact with ambient air to reduce acoustic signature.

15. The thrust reverser system of claim 1, wherein the moveable fairings trailing edges are shaped like scallops to increase contact with ambient air to reduce acoustic signature.

16. The thrust reverser system of claim 1, wherein the moveable fairings' trailing edges are fitted with chevrons to increase contact with ambient air to reduce acoustic signature.

17. The thrust reverser system of claim 1, wherein the moveable fairings' trailing edges are holes to educt ambient air due to lower static pressure of the engine exhaust gases to reduce noise signature.

18. The thrust reverser system of claim 1, wherein the tailpipe is fitted with a mixer to increase contact with ambient air to reduce acoustic signature, and wherein said mixer has a plurality of surfaces with perforations on at least one of the plurality of surfaces to educt ambient air through the perforations by the lower static pressure engine exhaust gases through said surfaces.

* * * * *